US012681685B2

(12) United States Patent
Moon et al.

(10) Patent No.: US 12,681,685 B2
(45) Date of Patent: Jul. 14, 2026

(54) METHOD OF OUTPUTTING AUDIO SIGNAL AND ELECTRONIC DEVICE FOR PERFORMING THE SAME

(71) Applicant: Samsung Electronics Co., Ltd., Suwon-si (KR)

(72) Inventors: Youngsin Moon, Suwon-si (KR); Hyungseoung Yoo, Suwon-si (KR); Gupil Cheong, Suwon-si (KR); Juyeon Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 155 days.

(21) Appl. No.: 18/628,130

(22) Filed: Apr. 5, 2024

(65) Prior Publication Data

US 2024/0354050 A1    Oct. 24, 2024

Related U.S. Application Data

(63) Continuation of application No. PCT/KR2024/001898, filed on Feb. 8, 2024.

(30) Foreign Application Priority Data

Apr. 11, 2023    (KR) ........................ 10-2023-0047690
Apr. 18, 2023    (KR) ........................ 10-2023-0051027

(51) Int. Cl.
  *G06F 3/16*         (2006.01)
  *G06F 3/04847*       (2022.01)
         (Continued)

(52) U.S. Cl.
  CPC .......... *G06F 3/165* (2013.01); *G06F 3/04847* (2013.01); *G06F 3/167* (2013.01); *H04B 17/318* (2015.01); *H04W 4/80* (2018.02)

(58) Field of Classification Search
  None
  See application file for complete search history.

(56) References Cited

U.S. PATENT DOCUMENTS 11,601,996 B2    3/2023  Burns et al.
2006/0258289 A1 *  11/2006  Dua ........................ H04W 4/70
                                  455/41.3
            (Continued)

FOREIGN PATENT DOCUMENTS

CN    105812903 A    7/2016
CN    112634884 A    4/2021
            (Continued)

OTHER PUBLICATIONS

International Search Report dated May 7, 2024; International Appln. No. PCT/KR2024/001898.

(Continued)

*Primary Examiner* — Walter F Briney, III
(74) *Attorney, Agent, or Firm* — Jefferson IP Law, LLP

(57)    ABSTRACT

An audio providing method is provided. The audio providing method includes receiving a first signal strength of a first signal including information on a first audio source device from a first audio output device establishing a wireless link with an electronic device, outputting the first signal strength in association with the information on the first audio source device, and controlling, when the first audio source device is selected, the first audio output device to receive a first audio broadcast stream transmitted by the first audio source device.

15 Claims, 22 Drawing Sheets

< Find a broadcast
See the broadcast around you to listen in.

Nearby streams ((•)) Second audio source device — 910, 911
                          — 912
First audio source device — 914
((•)) Third audio source device — 918
                          — 916

(51)  Int. Cl.
      _H04B 17/318_          (2015.01)
      _H04W 4/80_            (2018.01)

(56)                  References Cited

U.S. PATENT DOCUMENTS

| | | | | |
|---|---|---|---|---|
| 2012/0015618 A1* | 1/2012 | Heikkinen | .......... | H04M 1/6058 |
| | | | | 455/230 |
| 2017/0295422 A1 | 10/2017 | Chalmers et al. | | |
| 2019/0034161 A1* | 1/2019 | Jo | ....................... | G06F 3/04842 |
| 2021/0136439 A1* | 5/2021 | Yao | ....................... | H04N 21/458 |
| 2022/0070247 A1 | 3/2022 | Wang et al. | | |
| 2022/0201113 A1 | 6/2022 | Peng | | |
| 2022/0361264 A1* | 11/2022 | Burns | .................. | H04B 17/318 |
| 2023/0088236 A1* | 3/2023 | Medin | .................. | H04N 21/431 |
| | | | | 725/76 |

FOREIGN PATENT DOCUMENTS

| | | | | | |
|---|---|---|---|---|---|
| JP | 2011-035883 A | 2/2011 | | | |
| KR | 10-2008-0095126 A | 10/2008 | | | |
| KR | 10-2018-0080029 A | 7/2018 | | | |
| KR | 10-2022-0147243 A | 11/2022 | | | |
| KR | 10-2024-0041789 A | 4/2024 | | | |
| WO | WO-2022178712 A1 * | 9/2022 | ........... | H04L 65/611 |
| WO | 2023/027407 A1 | 3/2023 | | | |

OTHER PUBLICATIONS

Extended European Search Report dated Dec. 17, 2025; European Appln. No. 24788882.9-1218 / 4615003 PCT/KR2024001898.

* cited by examiner

From 430

710

Receive second signal strength of second signal including information on first audio source device received by target audio output device from target audio output device through wireless link

720

Output second signal strength in association with information on first audio source device End From 440

1010

Receive third signal strength of first audio broadcast stream of
first audio source device received by first audio output device
from first audio output device

1020

Output third signal strength in association with information
on first audio source device End

METHOD OF OUTPUTTING AUDIO SIGNAL AND ELECTRONIC DEVICE FOR PERFORMING THE SAME

CROSS-REFERENCE TO RELATED APPLICATION(S)

This application is a continuation application, claiming priority under § 365(c), of an International application No. PCT/KR2024/001898, filed on Feb. 8, 2024, which is based on and claims the benefit of a Korean patent application number 10-2023-0047690, filed on Apr. 11, 2023, in the Korean Intellectual Property Office, and of a Korean patent application number 10-2023-0051027, filed on Apr. 18, 2023, in the Korean Intellectual Property Office, the disclosure of each of which is incorporated by reference herein in its entirety.

BACKGROUND

1. Field

The disclosure relates to an electronic device for outputting an audio signal through an audio output device.

2. Description of Related Art

Electronic devices that support the existing Bluetooth legacy may search for an audio source device through scanning and then output an audio signal provided by the audio source device through pairing with the audio source device. For example, when a smartphone acting as an audio source device is paired with wireless earphones and an audio signal is generated through a music application on the smartphone, the audio signal may be output through the wireless earphones. When a user wants to listen to music through the wireless earphones on an electronic device other than the smartphone, the user needs to pair the wireless earphones with the other electronic device. The existing pairing with the smartphone needs to be canceled to pair the wireless earphones with the other electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device for outputting an audio signal through an audio output device.

Additional aspects will be set forth in part in the description which follows and, in part, will be apparent from the description, or may be learned by practice of the presented embodiments.

In accordance with an aspect of the disclosure, an electronic device is provided. The electronic device includes a display, a communication circuit, one or more processors, and memory, wherein the memory may store instructions that, when executed by the one or more processors, cause the electronic device to receive a first signal including information on a first audio source device through the communication circuit, determine a first signal strength of the first signal, output the first signal strength in association with the information on the first audio source device, and transmit, when the first audio source device is selected, an add source command to a first audio output device establishing a wireless link with the electronic device based on the information on the first audio source device.

In accordance with another aspect of the disclosure, an electronic device is provided. The electronic device includes a display, a communication circuit, one or more processors, and memory, wherein the memory may store instructions that, when executed by the one or more processors, cause the electronic device to receive a first signal strength of a first signal including information on a first audio source device from a first audio output device establishing a wireless link with the electronic device through the communication circuit, output the first signal strength in association with the information on the first audio source device, and control, when the first audio source device is selected, the first audio output device to receive a first audio broadcast stream transmitted by the first audio source device.

In accordance with another aspect of the disclosure, an audio providing method, performed by an electronic device, is provided. The audio providing method includes receiving a first signal strength of a first signal including information on a first audio source device from a first audio output device establishing a wireless link with the electronic device, outputting the first signal strength in association with the information on the first audio source device, and controlling, when the first audio source device is selected, the first audio output device to receive a first audio broadcast stream transmitted by the first audio source device.

In accordance with another aspect of the disclosure, an audio output device is provided. The audio output device includes a communication circuit, one or more processors, and memory, wherein the memory may store instructions that, when executed by the one or more processors, cause the audio output device to receive a first signal including information on a first audio source device, determine a first signal strength of the first signal, transmit the first signal strength to an electronic device through a wireless link established between the audio output device and the electronic device, receive a first audio broadcast stream broadcast by the first audio source device based on the information on the first source device, in response to a command instructing to receive the first audio broadcast stream broadcast by the first audio source device, and output a first audio signal of the first audio broadcast stream.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Hereinafter, various embodiments of the present disclosure will be described with reference to the accompanying drawings. However, this is not intended to limit the present disclosure to specific embodiments, and it should be understood that various modifications, equivalents, and/or alternatives of the embodiments of the present disclosure are included.

Figure 1:
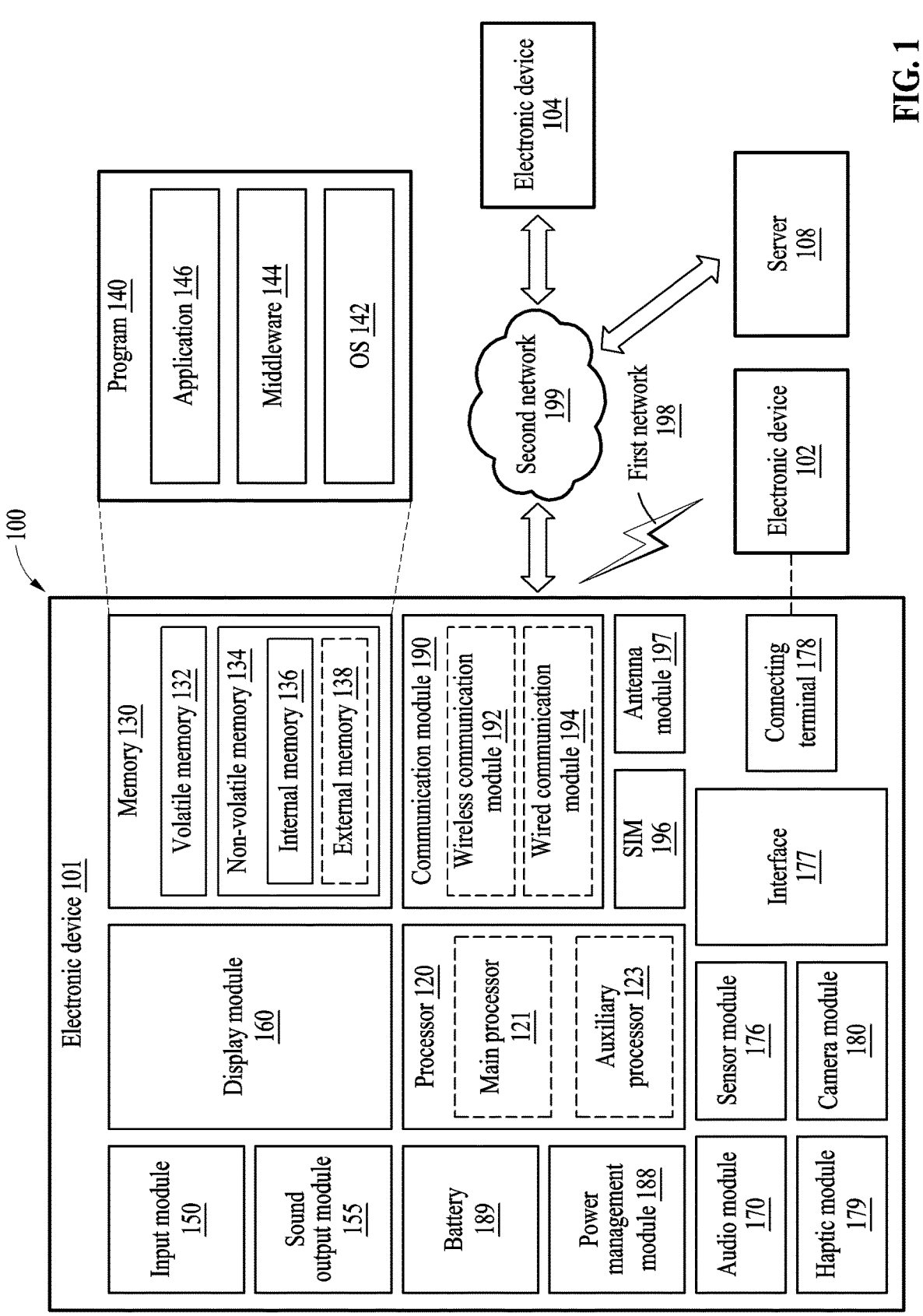
FIG. 1 is a block diagram of an electronic device in a network environment according to an embodiment of the disclosure.

FIG. 1 is a block diagram of an electronic device in a network environment according to an embodiment of the disclosure.

FIG. 1 is a block diagram illustrating an electronic device 101 in a network environment 100 according to an embodiment of the disclosure. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one (e.g., the connecting terminal 178) of the above components may be omitted from the electronic device 101, or one or more other components may be added in the electronic device 101. In some embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an embodiment, as at least a portion of data processing or computation, the processor 120 may store a command or data received from another component (e.g., the sensor module 176 or the communication module 190) in a volatile memory 132, process the command or the data stored in the volatile memory 132, and store resulting data in a nonvolatile memory 134. According to an embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a portion of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state, or together with the main processor 121 while the main processor 121 is an active state (e.g., executing an application). According to an embodiment, the auxiliary processor 123 (e.g., an ISP or a CP) may be implemented as a portion of another component (e.g., the camera module 180 or the communication module 190) that is functionally related to the auxiliary processor 123. According to an embodiment, the auxiliary processor 123 (e.g., an NPU) may include a hardware structure specified for artificial intelligence (AI) model processing. An artificial intelligence model may be generated through machine learning. Such learning may be performed, for example, by the electronic device 101 in which an artificial intelligence model is executed, or via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), deep Q-network, or a combination of two or more thereof, but is not limited thereto. The artificial intelligence model may, additionally or alternatively, include a software structure other than the hardware structure.

The memory 130 may store various pieces of data used by at least one component (e.g., the processor 120 or the sensor module 176) of the electronic device 101. The various pieces of data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an embodiment, the receiver may be implemented separately from the speaker or as a portion of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to sense a touch, or a pressure sensor adapted to measure an intensity of a force incurred by the touch.

The audio module 170 may convert a sound into an electrical signal or vice versa. According to an embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., by wire) or wirelessly. According to an embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or an electrical stimulus which may be recognized by a user via his or her tactile sensation or kinesthetic sensation. According to an embodiment, the haptic module 179 may include, for example, a motor, a piezoelectric element, or an electric stimulator.

The camera module 180 may capture a still image and moving images. According to an embodiment, the camera module 180 may include one or more lenses, image sensors, ISPs, or flashes.

The power management module 188 may manage power supplied to the electronic device 101. According to an embodiment, the power management module 188 may be implemented as, for example, at least a portion of a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that operate independently of the processor 120 (e.g., an application processor) and support direct (e.g., wired) communication or wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., a LAN or a wide area network (WAN))). These various types of communication modules may be implemented as a single component (e.g., a single chip), or may be implemented as multiple components (e.g., multiple chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a fourth generation (4G) network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), an array antenna, analog beamforming, or a large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., an external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an embodiment, another component (e.g., a radio frequency integrated circuit (RFIC)) other than the radiating element may be additionally formed as a portion of the antenna module 197.

According to various embodiments, the antenna module 197 may form a mm Wave antenna module. According to an embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an embodiment, all or some of operations to be executed by the electronic device 101 may be executed at one or more of external electronic devices (e.g., the external electronic devices 102 and 104, or the server 108). For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an Internet-of-things (IoT) device. The server 108 may be an intelligent server using machine learning and/or a neural network. according to an embodiment, the external electronic device 104 or the server 108 may be included in the second network 199. The electronic device 101 may be applied to intelligent services (e.g., a smart home, a smart city, a smart car, or healthcare) based on 5G communication technology or IoT-related technology.

The electronic device according to embodiments may be one of various types of electronic devices. The electronic device may include, for example, a portable communication device (e.g., a smart phone), a computer device, a portable multimedia device, a portable medical device, a camera, a wearable device, or a home appliance device. According to an embodiment of the disclosure, the electronic device is not limited to those described above.

It should be appreciated that embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, "A or B", "at least one of A and B", "at least one of A or B", "A, B or C", "at least one of A, B and C", and "at least one of A, B, or C", each of which may include any one of the items listed together in the corresponding one of the phrases, or all possible combinations thereof. Terms such as "first", "second", or "first" or "second" may simply be used to distinguish the component from other components in question, and do not limit the components in other aspects (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., by wire), wirelessly, or via a third element.

As used in connection with various embodiments of the disclosure, the term "module" may include a unit implemented in hardware, software, or firmware, and may interchangeably be used with other terms, for example, "logic", "logic block", "part", "circuit" or "circuitry". A module may be a single integral component, or a minimum unit or part thereof, adapted to perform one or more functions. For example, according to an embodiment, the module may be implemented in a form of an application-specific integrated circuit (ASIC).

Embodiments as set forth herein may be implemented as software (e.g., the program 140) including one or more instructions that are stored in a computer-readable storage medium (e.g., an internal memory 136 or an external memory 138) that is readable by a computer or machine (e.g., the electronic device 101). For example, a processor (e.g., the processor 120) of the computer/machine (e.g., the electronic device 101) may invoke at least one of the one or more instructions stored in the computer-readable storage medium, and execute it. This allows the computer/machine to be operated to perform at least one function according to the at least one instruction invoked. The one or more instructions may include code generated by a compiler or code executable by an interpreter. The computer-readable storage medium may be provided in the form of a non-transitory storage medium. Here, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and provided in a computer program product. The computer program product may be traded as a product between a seller and a buyer. The computer program product may be distributed in the form of a computer-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the computer-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to embodiments, one or more of the above-described components or operations may be omitted, or one or more other components or operations may be added. Alternatively or additionally, a plurality of components (e.g., modules or programs) may be integrated into a single component. In such a case, according to embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
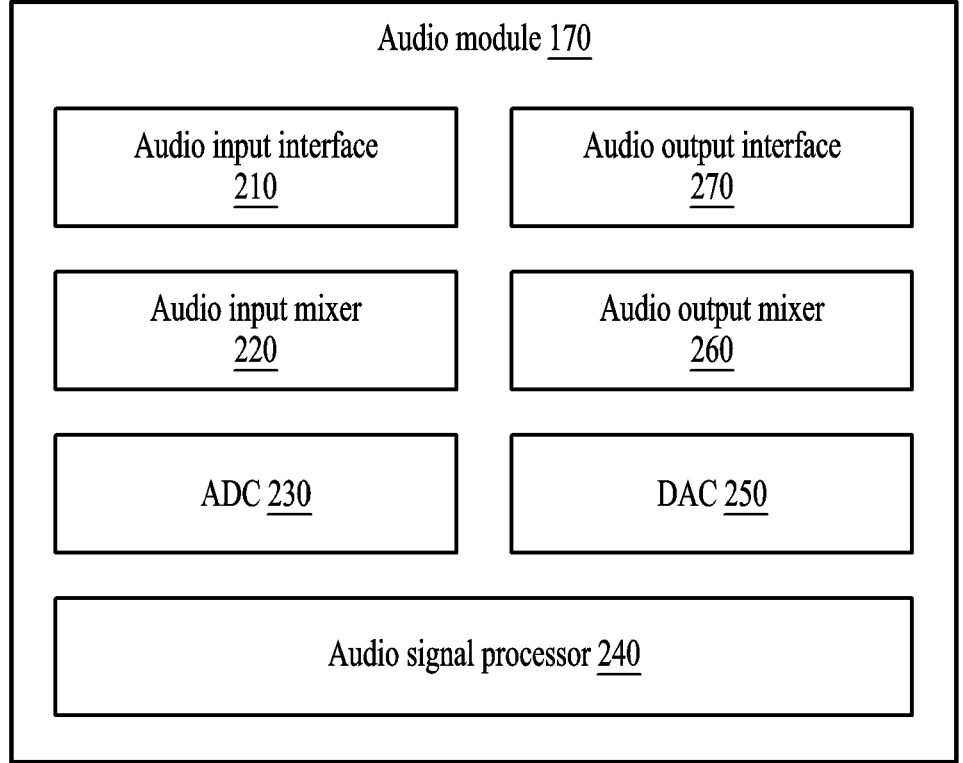
FIG. 2 is a block diagram of an audio module according to an embodiment of the disclosure.

FIG. 2 is a block diagram of an audio module according to an embodiment of the disclosure.

Referring to FIG. 2, the audio module 170 described above with reference to FIG. 1 may include, for example, an audio input interface 210, an audio input mixer 220, an analog-to-digital converter (ADC) 230, an audio signal processor 240, a digital-to-analog converter (DAC) 250, an audio output mixer 260, or an audio output interface 270.

The audio input interface 210 may receive an audio signal corresponding to a sound obtained from the outside of the electronic device 101 via a microphone (e.g., a dynamic microphone, a condenser microphone, or a piezo microphone) that is configured as part of the input module 150 or separately from the electronic device 101. For example, if an audio signal is obtained from the external electronic device 102 (e.g., a headset or a microphone), the audio input interface 210 may be connected with the external electronic device 102 directly via the connecting terminal 178, or wirelessly (e.g., Bluetooth™ communication) via the wireless communication module 192 to receive the audio signal. According to an embodiment, the audio input interface 210 may receive a control signal (e.g., a volume adjustment signal received via an input button) related to the audio signal obtained from the external electronic device 102. The audio input interface 210 may include a plurality of audio input channels and may receive a different audio signal via a corresponding one of the plurality of audio input channels, respectively. According to an embodiment, additionally or alternatively, the audio input interface 210 may receive an audio signal from another component (e.g., the processor 120 or the memory 130 of FIG. 1) of the electronic device 101.

The audio input mixer 220 may synthesize a plurality of input audio signals into at least one audio signal. For example, according to an embodiment, the audio input mixer 220 may synthesize a plurality of analog audio signals input via the audio input interface 210 into at least one analog audio signal.

The ADC 230 may convert an analog audio signal into a digital audio signal. For example, according to an embodiment, the ADC 230 may convert an analog audio signal received via the audio input interface 210 or, additionally or alternatively, an analog audio signal synthesized via the audio input mixer 220 into a digital audio signal.

The audio signal processor 240 may perform various processing on a digital audio signal received via the ADC 230 or a digital audio signal received from another component of the electronic device 101. For example, according to an embodiment, the audio signal processor 240 may perform changing a sampling rate, applying one or more filters, interpolation processing, amplifying or attenuating a whole or partial frequency bandwidth, noise processing (e.g., attenuating noise or echoes), changing channels (e.g., switching between mono and stereo), mixing, or extracting a specified signal for one or more digital audio signals. According to an embodiment, one or more functions of the audio signal processor 240 may be implemented in the form of an equalizer.

The DAC 250 may convert a digital audio signal into an analog audio signal. For example, according to an embodiment, the DAC 250 may convert a digital audio signal processed by the audio signal processor 240 or a digital audio signal obtained from another component (e.g., the processor 120 or the memory 130) of the electronic device 101 into an analog audio signal.

The audio output mixer 260 may synthesize a plurality of audio signals, which are to be output, into at least one audio signal. For example, according to an embodiment, the audio output mixer 260 may synthesize an analog audio signal converted by the DAC 250 and another analog audio signal (e.g., an analog audio signal received via the audio input interface 210) into at least one analog audio signal.

The audio output interface 270 may output an analog audio signal converted by the DAC 250 or, additionally or alternatively, an analog audio signal synthesized by the audio output mixer 260 to the outside of the electronic device 101 via the sound output module 155. The sound output module 155 may include, for example, a speaker, such as a dynamic driver or a balanced armature driver, or a receiver. According to an embodiment, the sound output module 155 may include a plurality of speakers. In such a case, the audio output interface 270 may output audio signals having a plurality of different channels (e.g., stereo channels or 5.1 channels) via at least some of the plurality of speakers. According to an embodiment, the audio output interface 270 may be connected with the external electronic device 102 (e.g., an external speaker or a headset) directly via the connecting terminal 178 or wirelessly via the wireless communication module 192 to output an audio signal.

According to an embodiment, the audio module 170 may generate, without separately including the audio input mixer 220 or the audio output mixer 260, at least one digital audio signal by synthesizing a plurality of digital audio signals using at least one function of the audio signal processor 240.

According to an embodiment, the audio module 170 may include an audio amplifier (not shown) (e.g., a speaker amplifying circuit) that is capable of amplifying an analog audio signal input via the audio input interface 210 or an audio signal that is to be output via the audio output interface 270. According to an embodiment, the audio amplifier may be configured as a module separate from the audio module 170.

Figure 3:
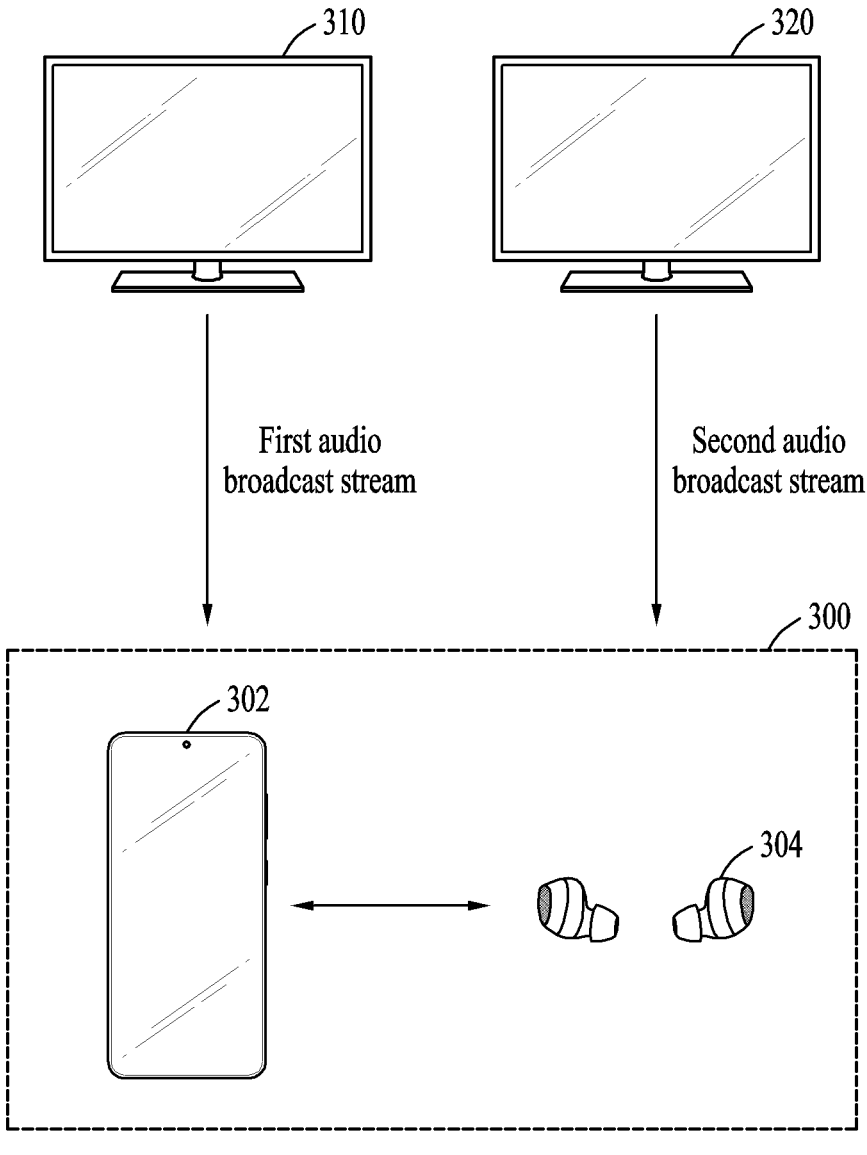
FIG. 3 is a configuration diagram of an audio signal output system according to an embodiment of the disclosure.

FIG. 3 is a diagram of an audio signal output system according to an embodiment of the disclosure.

According to an embodiment, an audio signal output system 300 may include an electronic device 302 (e.g., the electronic device 101 of FIG. 1) and an audio output device 304 (e.g., the electronic device 102 or 104 of FIG. 1). For example, the audio output device 304 may be connected to the electronic device 302 through a wireless link and may exchange data with the electronic device 302 through the wireless link. For example, the wireless link may be Bluetooth, but is not limited thereto.

According to an embodiment, the audio output device 304 may establish wireless links simultaneously with a plurality of audio output devices including the audio output device 304.

According to an embodiment, the audio output device 304 may provide a user with an audio by outputting an audio signal received from the electronic device 302 through the wireless link. For example, the audio output device 304 may include central devices (or primary devices or main devices) and peripheral devices (or secondary devices or sub-devices) respectively to be worn on both ears of a plurality of users.

According to an embodiment, to receive an audio signal from an audio source device to which legacy connection Advanced Audio Distribution Profile (A2DP) or unicast connection Bluetooth technology is applied, the electronic device 302 may detect an audio source device through scanning, perform pairing with the detected audio source device, and receive an audio signal in a paired state. For example, the received audio signal may be in the form of a connected isochronous stream (CIS). According to the Bluetooth connection, the electronic device 302 may require to be paired with an audio source device every time to receive an audio signal. For example, the electronic device 302 may receive an audio signal from the paired audio source device and output an audio through the audio output device 304 paired with the electronic device 302 based on the audio signal.

According to an embodiment, an audio source device 310 or 320 may broadcast an audio signal in the form of a broadcast isochronous stream (BIS). For example, the electronic device 302 may detect information on the audio source devices 310 and 320 by scanning and may receive an audio signal by receiving BIS from the audio source device 310 or 320 based on the detected information. The electronic device 302 may receive an audio signal from the audio source device 310 or 320 without pairing with the audio source device 310 or 320. The audio source device 310 or 320 does not need to be paired with the electronic device 302 to transmit an audio signal and may thus broadcast the audio signal.

According to an embodiment, when one or more audio source devices 310 and 320 are detected, the user of the electronic device 302 may select one from the audio source devices 310 and 320 to listen to audio. The electronic device 302 may generate a list of detected audio source devices and provide the list through a display (e.g., the display module 160 of FIG. 1) to the user, for selection by the user. The user may select one from the audio source devices 310 and 320 through the list. The electronic device 302 may receive an audio signal by receiving BIS of the selected first audio source device 310 and may control the audio output device 304 to output the audio signal through the audio output device 304.

According to an embodiment, the electronic device 302 may detect a first audio source device 310 through scanning and receive an audio signal by receiving a BIS broadcast by the first audio source device 310. For example, the electronic device 302 may output the audio through a speaker of the electronic device 302. For example, the electronic device 302 may output the audio through an audio output device wired or wirelessly connected to the electronic device 302.

According to an embodiment, although it is described that the electronic device 302 receives the audio signal broadcasted by the audio source device 310 or 320, the audio output device 304 may also receive the audio signal broadcasted by the audio source device 310 or 320. Not only the electronic device 302, but also the audio output device 304 may support the low energy (LE) Audio standard. For example, the audio output device 304 may receive information on an extended advertisements (EA) signal or periodic advertising trains (PA) signal broadcast by the audio source device 310 or 320 from the electronic device 302, and directly receive a BIS broadcast by the audio source device 310 or 320 based on the PA signal.

According to an embodiment, the electronic device 302 may include at least one of a smartphone, a tablet, a smartwatch, a device for extended reality (XR), or a cradle of the audio output device 304.

Hereinafter, a method of outputting an audio signal from an audio source device through the audio signal output system 300 is described with reference to FIGS. 4, 5A to 5C, and 6 to 20.

Figure 4:
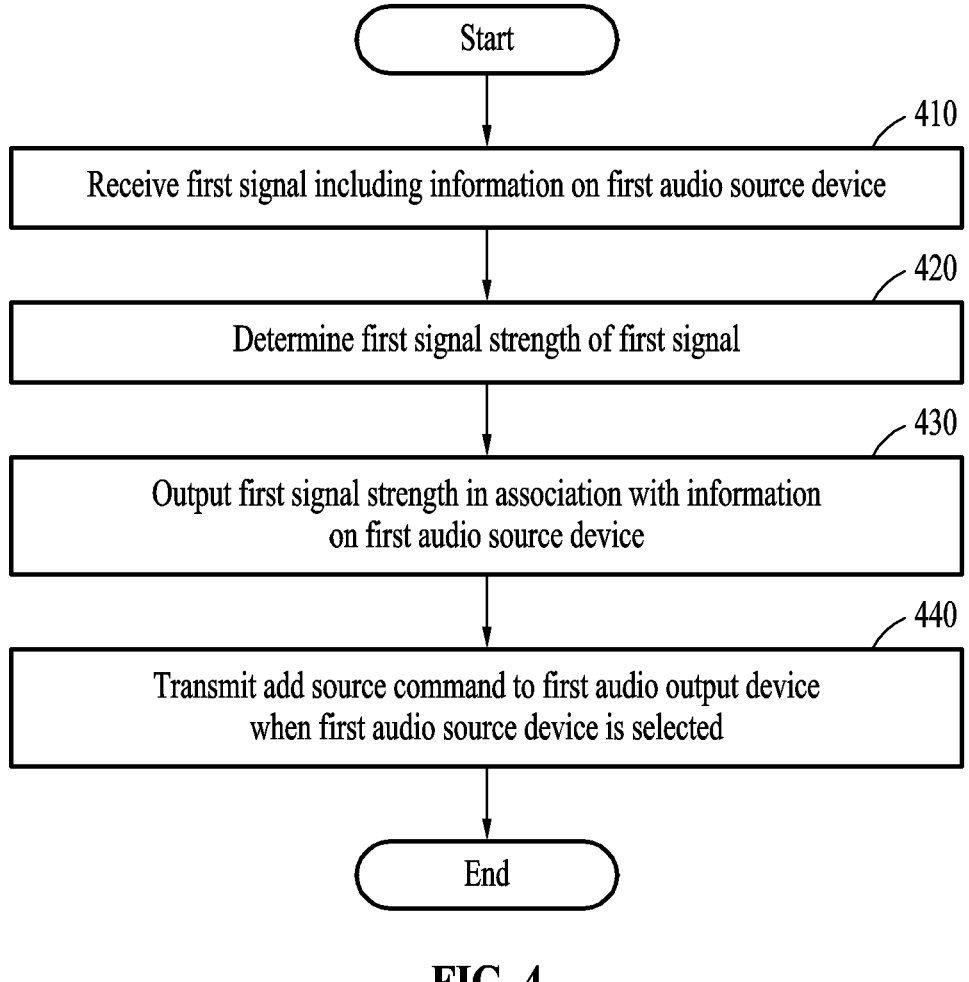
FIG. 4 is a flowchart of an audio signal output method performed by an electronic device according to an embodiment of the disclosure.

FIG. 4 is a flowchart of an audio signal output method performed by an electronic device according to an embodiment of the disclosure.

Operations 410 to 440 described below may be performed by an electronic device (e.g., the electronic device 101 of FIG. 1 or the electronic device 302 of FIG. 3). For example, the electronic device may include a processor (e.g., the processor 120 of FIG. 1), a communication module (e.g., the communication module 190 of FIG. 1), memory (e.g., the memory 130 of FIG. 1), and a display (e.g., the display module 160 of FIG. 1).

In operation 410, the processor of the electronic device may receive a first signal including information on a first audio source device (e.g., the first audio source device 310 or the second audio source device 320 of FIG. 3) through the communication module. For example, the first audio source device may periodically broadcast the information on the first audio source device, and the electronic device may scan external data through the communication module to receive the first signal including the broadcast information on the first audio source device. For example, the first signal including the information on the audio source device may be an EA signal or a PA signal. For example, the information on the first audio source device may include at least one of identification information of the first audio source device, account information, address information, clock information, information on the first audio signal, timing information, transmission power information, or audio channel map information. For example, the first signal may be a signal of a packet of ADV_EXT_IND, a packet of AUX_ADV_IND, or a packet of AUX_SYNC_IND.

In operation 420, the processor may determine a first signal strength based on at least a portion of the received first signal. According to an embodiment, the processor may determine the first signal strength of the first signal based on a receiver signal strength indicator (RSSI) of the first signal. For example, the first signal strength may be a target signal strength including the RSSI among a plurality of signal strengths having preset RSSI ranges. An example of the plurality of signal strengths having preset RSSI ranges is shown in Table 1 below.

TABLE 1

| RSSI (x) | Signal strength |
| --- | --- |
| −50 ≤ x | 0 |
| −70 ≤ x < −50 | 1 |
| −90 ≤ x < −70 | 2 |
| x < −90 | 3 |

In operation 430, the processor may output the first signal strength in association with the information on the first audio source device. The processor may output the received information on the first audio source device and the first signal strength through the display. For example, the processor may generate a list including at least a portion of the information on the first audio source device and output the generated list through the display. For example, the first signal strength may be output along with identification information (e.g., a device name) indicating the first audio source device. For example, an alphanumeric, image, or icon corresponding to the first signal strength may be output as the first signal strength. A method of outputting the first signal strength in association with the information on the first audio source device is described in detail below with reference to FIG. 6.

A user may check a signal strength of a signal broadcast by the first audio source device along with the information on the first audio source device using the electronic device, and determine whether to receive the first audio broadcast stream broadcast by the first audio source device using a first audio output device (e.g., the electronic device 102 or 104 of FIG. 1 or the audio output device 304 of FIG. 3) based on the signal strength.

In operation 440, the processor may transmit, when the first audio source device is selected by the user, an add source command to the first audio output device establishing a wireless link with the electronic device based on the information on the first audio source device. For example, the user of the electronic device may select the first audio source device from among one or more audio source devices output on the display through a user interface (UI) or user experience (UX). For example, when a plurality of audio source devices are detected, the plurality of audio source devices may be output on the display in the form of a list, and the user may select the first audio source device by selecting one from the list. For example, the add source command may include at least one of address information, a broadcast identifier, PA synchronization information, or BIS information of the first audio source device.

According to an embodiment, the wireless link may be established between the electronic device and the first audio output device before operation 440 is performed. For example, the wireless link may be Bluetooth or Bluetooth low energy (BLE).

According to an embodiment, the electronic device may establish wireless links with one or more audio output devices. For example, the electronic device may establish wireless links respectively with a first audio output device including a pair of devices and a second audio output device including another pair of devices. For example, the user of the electronic device may select in advance the first audio output device to which the first audio source device is to be assigned through the UI or UX from among the one or more audio output devices output on the display. A method of selecting in advance an audio output device to which a user wants to assign an audio source device is described in detail below with reference to FIGS. 5B and 5C.

According to an embodiment, the first audio output device receiving the address information of the first audio broadcast stream from the electronic device may receive a PA signal broadcast by the first audio source device based on the add source command and receive the first audio broadcast stream based on the PA signal. For example, the first audio output device may synchronize and receive the PA signal based on the add source command and receive the audio broadcast stream based on information on the audio broadcast stream included in the BIGInfo field in the PA signal. For example, the first audio broadcast stream received may be a BIS. The first audio output device may provide an audio to the user by outputting the first audio signal of the first audio broadcast stream.

According to an embodiment, the first audio broadcast stream may include a first sub-audio broadcast stream and a second sub-audio broadcast stream for stereophony. For example, when the first audio output device includes a first external device and a second external device, the first external device may identify the first sub-audio broadcast stream based on the add source command and output a first sub-audio signal based on the first sub-audio broadcast stream, and the second external device may identify the second sub-audio broadcast stream based on the add source command and output a second sub-audio signal based on the second sub-audio broadcast stream.

Figure 5A:
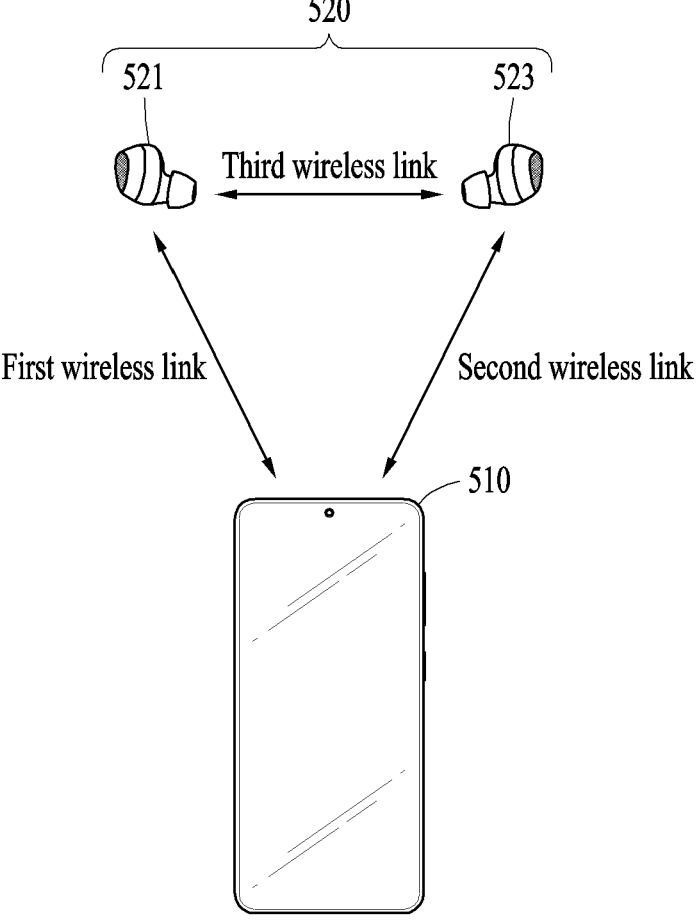
FIG. 5A illustrates wireless links established between an electronic device and an audio output device according to an embodiment of the disclosure.

FIG. 5A illustrates wireless links established between an electronic device and an audio output device according to an embodiment of the disclosure.

An audio output device 520 (e.g., the electronic device 102 or 104 of FIG. 1 or the audio output device 304 of FIG. 3) may include a first external device 521 and a second external device 523. For example, the first external device 521 may be a device worn on the left ear (or right ear) of a user, and the second external device 523 may be a device worn on the right ear (or left ear) of the user. For example, a wireless link (e.g., a third wireless link) may be established between the first external device 521 and the second external device 523 to exchange data between the devices 521 and 523.

According to an embodiment, a first wireless link may be established between an electronic device 510 (e.g., the electronic device 101 of FIG. 1 or the electronic device 302 of FIG. 3) and the first external device 521, and a second wireless link may be established between the electronic device 510 and the second external device 523. The first external device 521 and the second external device 523 may receive an add source command from the electronic device 510 through their respective wireless links. Data for audio time synchronization may be exchanged through the third wireless link established between the first external device 521 and the second external device 523.

Figure 5B:
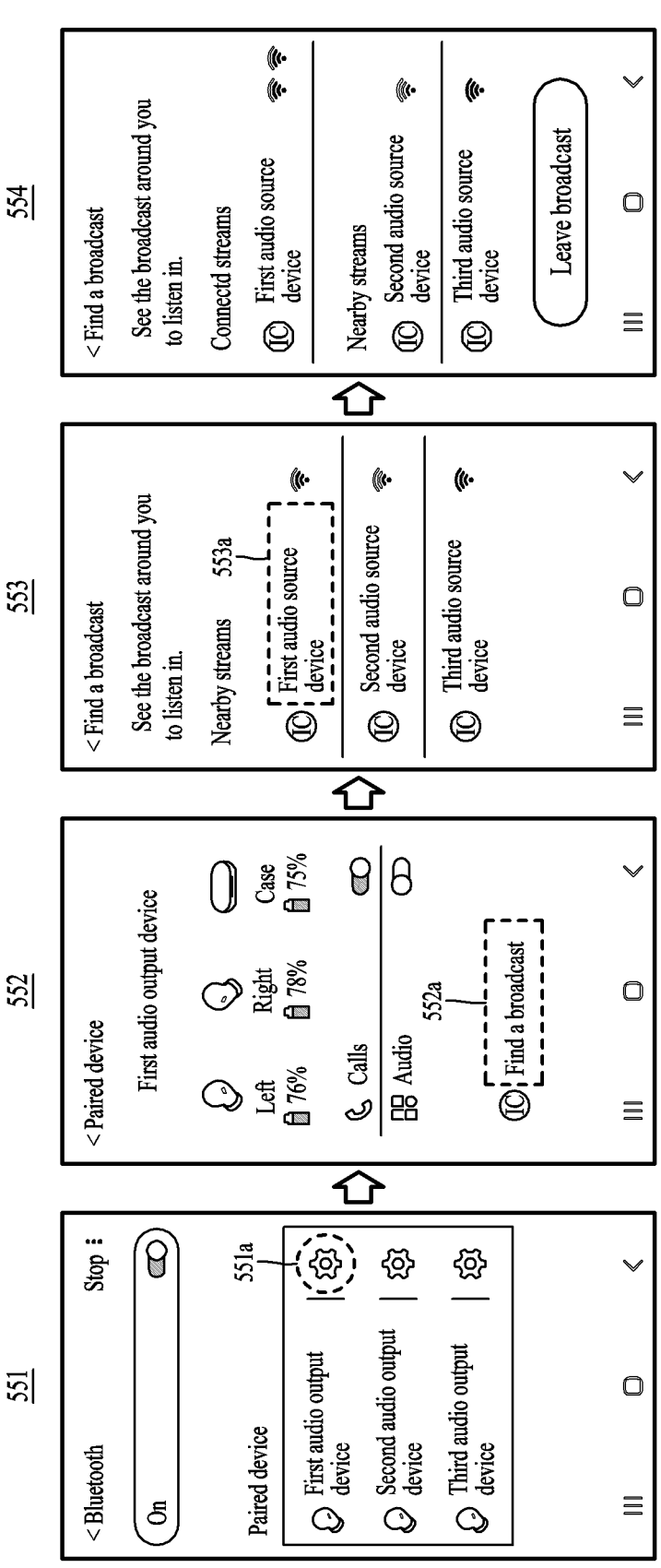
FIG. 5B illustrates a user experience (UX) for selecting in advance a first audio output device to which a user wants to assign a first audio source device according to an embodiment of the disclosure.

FIG. 5B illustrates a UX for selecting in advance a first audio output device to which a user wants to assign a first audio source device according to an embodiment of the disclosure.

Referring to FIG. 5B, a first UX 551, a second UX 552, a third UX 553, and a fourth UX 554 shown therein may be uXs output by a display (e.g., the display module 160 of FIG. 1) of an electronic device (e.g., the electronic device 101 of FIG. 1 or the electronic device 302 of FIG. 3).

The first UX 551 may display a list of one or more devices paired with the electronic device. In a case where the electronic device is paired in advance with a first audio output device, a second audio output device, and a third audio output device, the first audio output device, the second audio output device, and the third audio output device may be shown through a list. For example, the name of an audio output device and an icon (e.g., earphones, headphones, or a speaker) representing the type of the corresponding audio output device may be output in association through the list. A user may select an audio output device to which an audio source device is to be assigned. For example, the user may touch an area 551a in the list corresponding to the first audio output device to assign the audio source device to the first audio output device.

The second UX 552 may display information associated with the first audio output device and settings of operating options. For example, the second UX 552 may display a battery state of the first audio output device and an operating option regarding whether to perform a call through the first audio output device. For example, in a case where an audio source device is assigned to the first audio output device, the second UX 552 may display information on the corresponding audio source device. For example, the second UX 552 may display a menu 552a for assigning an audio source device to the first audio output device. The user may touch the menu 552a to assign an audio source device to the first audio output device.

The third UX 553 may display a list of one or more audio source devices assignable to the first audio output device. The electronic device may detect the first audio output device, the second audio output device, and the third audio output device through scanning, and information on the first audio output device, the second audio output device, and the third audio output device may be displayed in the list. For example, the scanning may be performed periodically. For example, the scanning may be performed when the user touches the menu 552a. For example, the information on an audio source device and an icon representing the signal strength of a signal broadcast by the corresponding audio source device may be output in association through the list. The user may select the audio source device based on the information on the audio source device and the signal strength. For example, the user may touch an area 553a in the list corresponding to the first audio source device to assign the first audio source device to the first audio output device.

The fourth UX 554 may display a list of state information of one or more audio source devices scanned by the electronic device. For example, the list may display audio source devices that are assigned to audio output devices paired with the electronic device as an item of "Connected streams" and display audio source devices that are not assigned to the audio output devices as "Nearby streams". The user may check the state information of the one or more audio source devices detected by the electronic device through the fourth UX 554.

Figure 5C:
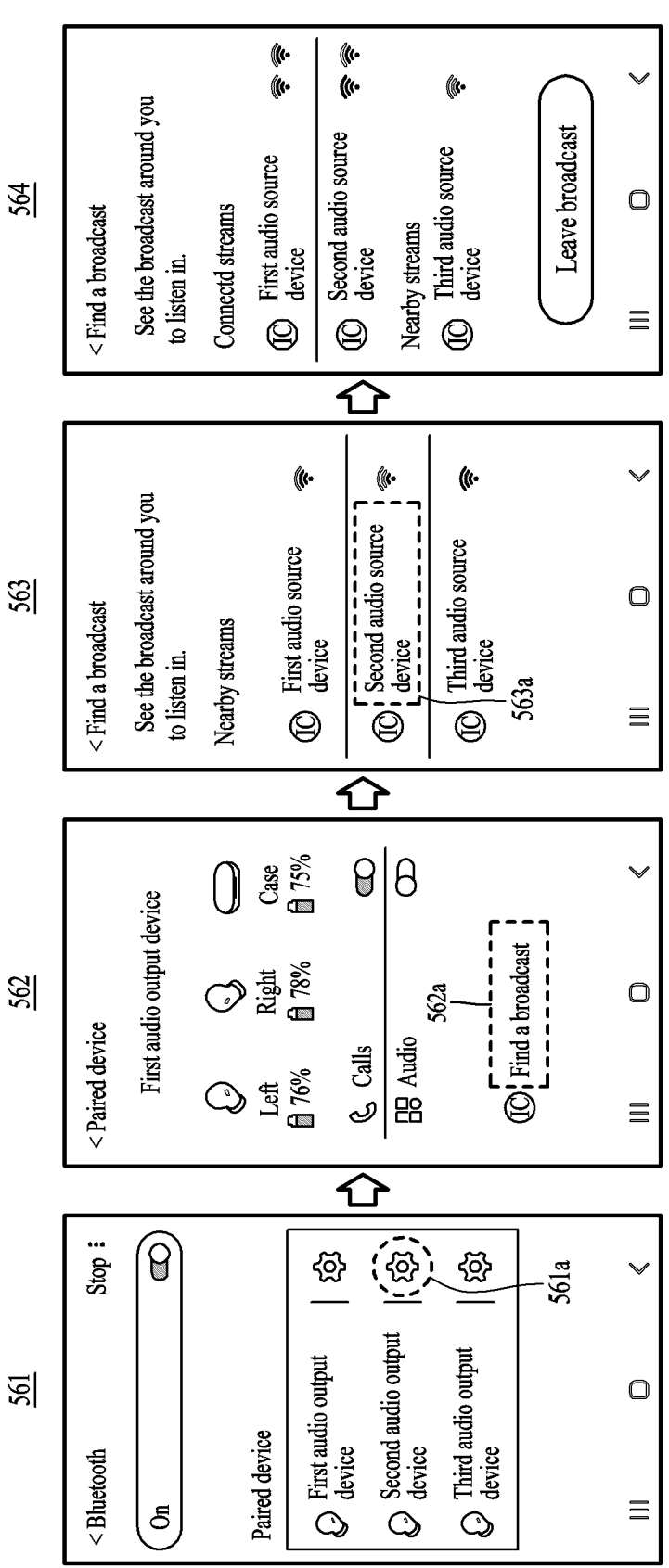
FIG. 5C illustrates a UX for selecting in advance a second audio output device to which a user wants to assign a second audio source device according to an embodiment of the disclosure.

FIG. 5C illustrates a UX for selecting in advance a second audio output device to which a user wants to assign a second audio source device according to an embodiment of the disclosure.

Referring to FIG. 5C, a first UX 561, a second UX 562, a third UX 563, and a fourth UX 564 shown therein may be uXs output by a display (e.g., the display module 160 of FIG. 1) of an electronic device (e.g., the electronic device 101 of FIG. 1 or the electronic device 302 of FIG. 3).

The first UX 561 may display a list of one or more devices paired with the electronic device. The description of the first UX 561 may be replaced with the description of the first UX 551 provided above with reference to FIG. 5B. For example, a user may touch an area 561a in a list corresponding to a second audio output device to assign an audio source device to the second audio output device.

The second UX 562 may display information associated with the second audio output device and settings of operating options. The description of the second UX 562 may be replaced with the description of the second UX 552 provided above with reference to FIG. 5B. The user may touch a menu 562a to assign an audio source device to the first audio output device.

The third UX 563 may display a list of one or more audio source devices assignable to the first audio output device. The description of the third UX 563 may be replaced with the description of the third UX 563 provided above with reference to FIG. 5B. For example, the user may touch an area 563a in the list corresponding to the second audio source device to assign the second audio source device to the second audio output device.

The fourth UX 564 may display a list of state information of one or more audio source devices scanned by the electronic device. In a case where a first audio source device is assigned to the first audio output device, the first audio source device may be further displayed in an item of "Connected streams", in addition to the second audio source device assigned to the second audio output device.

Figure 6:
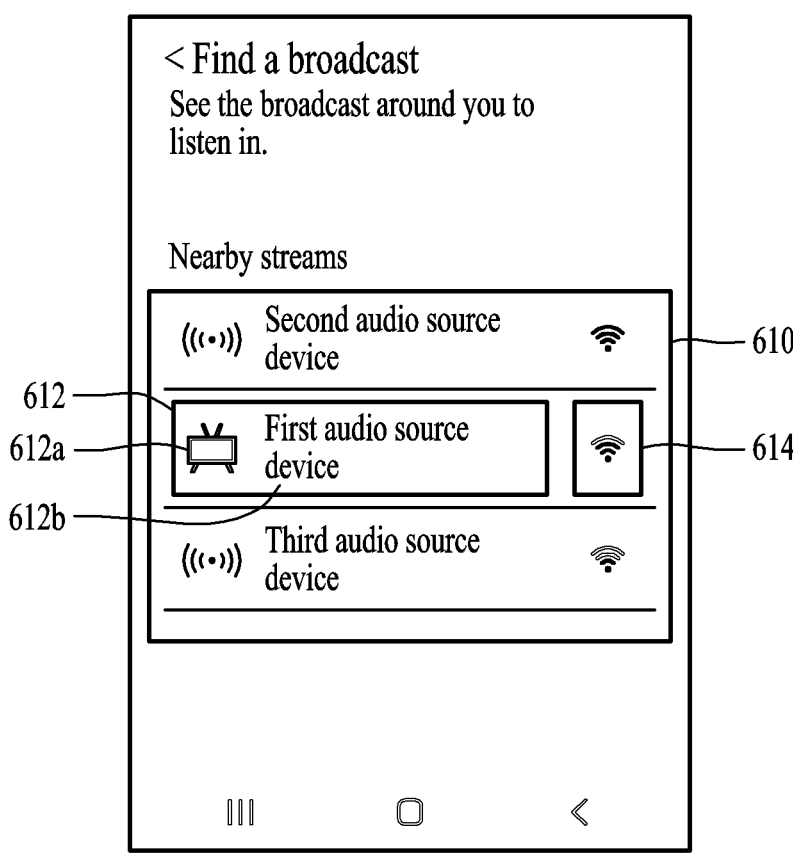
FIG. 6 illustrates a list generated so that a signal strength of a signal broadcast by an audio source device is displayed through a UX of an electronic device according to an embodiment of the disclosure.

FIG. 6 illustrates a list generated so that a signal strength of a signal broadcast by an audio source device is displayed through a UX of an electronic device according to an embodiment of the disclosure.

According to an embodiment, an electronic device (e.g., the electronic device 101 of FIG. 1, the electronic device 302 of FIG. 3, or the electronic device 510 of FIG. 5A) may perform scanning for detecting signals (EA signals or PA signals) broadcast in the vicinity of the electronic device. For example, through the scanning, a signal including first information on a first audio source device, a signal including second information on a second audio source device, and a signal including third information on a third audio source device may be received. The electronic device may determine the quality of at least one signal received through the scanning and display quality-related information on a screen based on the determined quality. For example, the electronic device may generate and output a list 610 displaying a signal strength determined for each signal along with the first information, the second information, and the third information. Although an UX is shown and described in the form of a list, the output form of information and a signal strength is not limited to the form of a list. For example, the UX may be implemented in the form of a plurality of blocks each including information and a signal strength.

For example, first information 612 displayed in the list 610 may include a first icon 612a and/or a first identifier 612b. The first icon 612a may graphically represent the form of the first audio source device. The first identifier 612b may be an identifier for identifying the first audio source device or the first audio signal. For example, a first signal strength 614 displayed in association with the first information 612 may be a numeric, image, or icon corresponding to the signal strength determined for a signal received from the first audio source device. Each of the plurality of signal strengths output through the display may be displayed to be distinguished from the other signal strengths. For example, the plurality of signal strengths may have the same image but be in different colors. For example, the plurality of signal strengths may have different numbers. For example, each of the plurality of signal strengths may have text indicating the corresponding signal strength. For example, each of the plurality of signal strengths may further include an image representing a device (an electronic device, an audio output device, or a cradle of the audio output device) having determined the signal strength. For example, each of the plurality of signal strengths may further include a background color set for the device (the electronic device, the audio output device, or the cradle of the audio output device) having determined the signal strength.

The electronic device may change the order of arrangement of the first information 612, second information, and third information in the list based on the magnitudes of the determined signal strengths. For example, if the second signal strength corresponding to second information is greater than the other signal strengths, the second information may be placed at the top of the list 610.

The electronic device may generate the list 610 displaying only a portion of the plurality of pieces of information. For example, when the number of detected audio source devices is greater than or equal to a preset number, the electronic device may determine a preset number of pieces of information among the plurality of pieces of information based on the magnitudes of the signal strengths and generate the list 610 displaying the preset number of pieces of information.

The user may select any one of the first information 612, the second information, and the third information displayed in the list 610. For example, the user may select the first information 612 by touching an area of the display corresponding to the first information 612.

According to an embodiment, when the user selects the first information, the electronic device may transmit an add source command to the first audio output device (e.g., the electronic device 102 or 104 of FIG. 1, the audio output device 304 of FIG. 3, or the audio output device 520 of FIG. 5A).

The first audio output device may receive a PA signal broadcast by the first audio source device based on the add source command and transmit a signal strength of the PA signal to the electronic device. Upon receiving the signal strength of the PA signal, the electronic device may maintain the first signal strength 614 or change the first signal strength 614 to another signal strength based on the received signal strength of the PA signal. For example, the electronic device may simultaneously display the signal strength of the EA signal (or the PA signal) received by the electronic device and the signal strength of the PA signal received by the first audio output device to be distinguished from each other. For example, the electronic device may determine one signal strength based on the signal strength of the EA/PA signal received by the electronic device and the signal strength of the PA signal received by the first audio output device, and display the determined one signal strength. The first audio output device may receive a first audio broadcast stream broadcast by the first audio source device based on the PA signal, and transmit the signal strength of the first audio broadcasting stream to the electronic device. Upon receiving the signal strength of the first audio broadcast stream, the electronic device may maintain the first signal strength 614 or change the first signal strength 614 to another signal strength based on the received signal strength of the first audio broadcast stream. For example, the electronic device may simultaneously display the signal strength of the EA/PA signal received by the electronic device and the signal strength of a BIS received by the first audio output device to be distinguished from each other. For example, the electronic device may determine one signal strength based on the signal strength of the EA/PA signal received by the electronic device and the signal strength of the first audio broadcast stream received by the first audio output device, and display the determined one signal strength.

Figure 7:
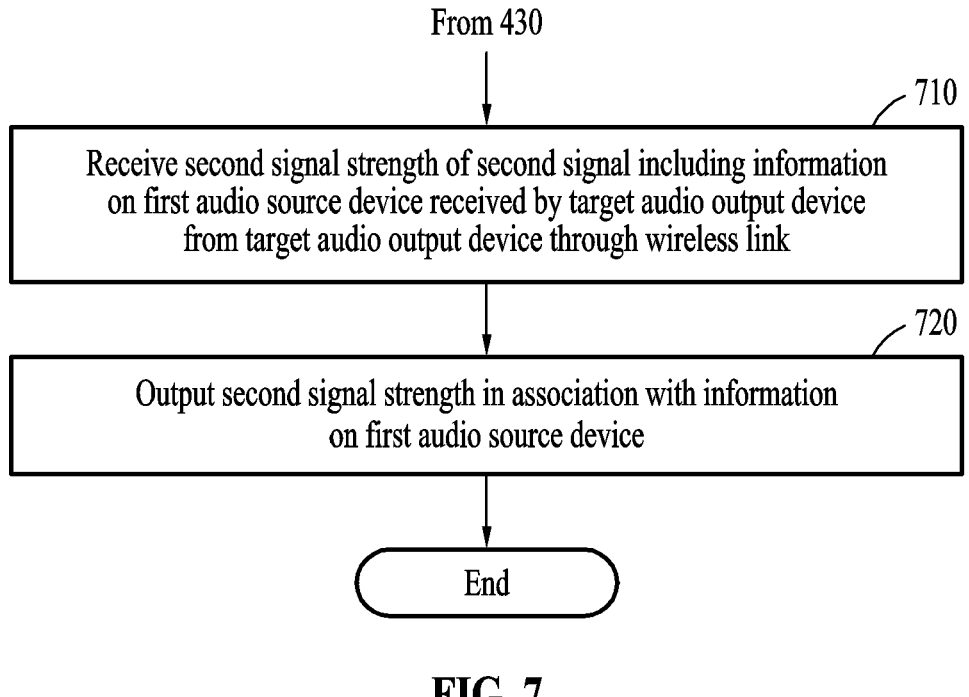
FIG. 7 is a flowchart of a method of outputting a second signal strength of a second signal including information on a first audio source device received from an audio output device according to an embodiment of the disclosure.

FIG. 7 is a flowchart of a method of outputting a second signal strength of a second signal including information on a first audio source device received from an audio output device according to an embodiment of the disclosure.

According to an embodiment, operations 710 and 720 described below may be further performed after operation 430 described above with reference to FIG. 4 is performed. Operations 710 and 720 may be performed by an electronic device (e.g., the electronic device 101 of FIG. 1, the electronic device 302 of FIG. 3, or the electronic device 510 of FIG. 5A).

In operation 710, a processor (e.g., the processor 120 of FIG. 1) of the electronic device may receive a second signal strength of a second signal including information on a first audio source device (e.g., the first audio source device 310 or the second audio source device 320 of FIG. 3) received by a first audio output device (e.g., the electronic device 102 or 104 of FIG. 1, the audio output device 304 of FIG. 3, or the audio output device 520 of FIG. 5A) through a wireless link. For example, when a user enters a UX or menu on the electronic device to select an audio source device to assign to the first audio output device, the electronic device may receive the second signal strength of the second signal from the first audio output device. For example, if the second signal strength changes compared to the previous signal strength, the first audio output device may transmit the second signal strength of the second signal to the electronic device.

According to an embodiment, the electronic device may receive the second signal strength of the second signal from the first audio output device through a synchronous connection-oriented (SCO) link or an asynchronous connectionless (ACL) link (e.g., an LE ACL link).

The first audio output device may include a wireless communication module and an audio module. The description of the wireless communication module and the audio module of the first audio output device may be replaced with the description of the wireless communication module 192 and the audio module 170 provided above with reference to FIGS. 1 and 2.

According to an embodiment, the first audio output device may receive the second signal including the information on the first audio source device through the wireless communication module. The second signal may be a signal corresponding to the first signal including the information on the first audio source device received by the electronic device. For example, the second signal may be an EA signal the same as the first signal or may be a PA signal broadcast by the first audio source device after the first signal is broadcast. For example, the information on the first audio source device included in the first signal (e.g., at least one of identification information of the first audio source device, account information, address information, clock information, information on the first audio signal, timing information, transmission power information, or audio channel map information) may be the same as or correspond to information on the first audio source device included in the second signal.

The first audio output device may determine a second signal strength of the received second signal. The description of the method of determining the second signal strength may be replaced with the description of operation 420 described above with reference to FIG. 4.

The first audio output device may transmit the second signal strength of the second signal to the electronic device through a wireless link established between the first audio output device and the electronic device. The second signal strength of the second signal is the signal strength determined by the first audio output device to directly receive an audio broadcast stream from the first audio source device and thus, may more accurately reflect an actual wireless environment compared to the first signal strength of the first signal determined by the electronic device.

According to an embodiment, the first audio output device may receive signals broadcast by one or more audio source devices and determine signal strengths of the signals, respectively. The first audio output device may transmit pieces of information on the one or more audio source devices and the signal strengths to the electronic device.

According to an embodiment, the first audio output device may include a first external device (e.g., the first external device 521 of FIG. 5A) and a second external device (e.g., the second external device 523 of FIG. 5A). A first wireless link may be established between the electronic device and the first external device, and a second wireless link may be established between the electronic device and the second external device. The processor of the electronic device may receive a second-first signal strength of a second-first signal including the information on the first audio source device received by the first external device from the first external device through the first wireless link. The processor of the electronic device may receive a second-second signal strength of a second-second signal including the information on the first audio source device received by the second external device from the second external device through the second wireless link.

According to an embodiment, before operation 720 is performed, the electronic device may determine whether the first audio source device indicated by the second signal is an audio source device that is not identified by scanning by the electronic device. If the first audio source device is an audio source device that is not identified by the scanning by the electronic device, the electronic device may add new information on the first audio source device to the list (e.g., the list 610 of FIG. 6).

In operation 720, the processor of the electronic device may output the second signal strength in association with the information on the first audio source device. For example, the electronic device may change the first signal strength 614 in the list 610 described above with reference to FIG. 6 to the second signal strength. Depending on the magnitude of the second signal strength, the order of arrangement of the first information 612 in the list 610 may be changed.

According to an embodiment, when the electronic device receives the pieces of information on the one or more audio source devices and the signal strengths from the first audio output device, the electronic device may generate a list displaying the received pieces of information and the signal strengths. An example of the generated list is described in detail below with reference to FIG. 8.

According to an embodiment, the processor of the electronic device may determine the second signal strength based on the second-first signal strength received from the first external device and the second-second signal strength received from the second external device, and output the second signal strength in association with the information on the first audio source device.

According to an embodiment, the processor of the electronic device may determine an integrated signal strength based on the first signal strength determined by the electronic device and the second signal strength received from the first audio output device, and output the integrated signal strength in association with the information on the first audio source device.

According to an embodiment, the processor of the electronic device may output the signal strengths that are based on the first signal strength determined by the electronic device, the second-first signal strength received from the first external device, and the second-second signal strength received from the second external device in association with the information on the first audio source device.

According to an embodiment, the processor of the electronic device may output the first signal strength determined by the electronic device and the second signal strength received from the first audio output device in association with the information on the first audio source device.

Figure 8:
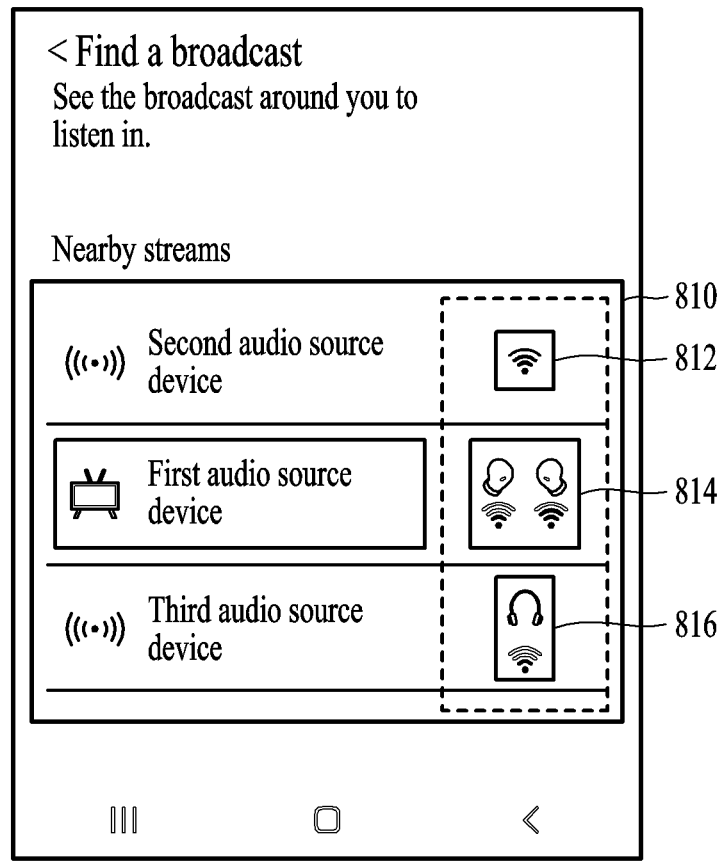
FIG. 8 illustrates a list generated so that a second signal strength of a second signal received from an audio output device is displayed through a UX of an electronic device according to an embodiment of the disclosure.

FIG. 8 illustrates a list generated so that a second signal strength of a second signal received from an audio output device is displayed through a UX of an electronic device according to an embodiment of the disclosure.

According to an embodiment, an electronic device (e.g., the electronic device 101 of FIG. 1, the electronic device 302 of FIG. 3, or the electronic device 510 of FIG. 5A) may receive information on a first audio source device and a signal strength from a first audio output device (e.g., the electronic device 102 or 104 of FIG. 1, the audio output device 304 of FIG. 3, or the audio output device 520 of FIG. 5A). The electronic device may generate and output a list 810 displaying a signal strength along with information on the first audio source device.

A signal strength 814 displayed in association with the information on the first audio source device may be a numeric, image, or icon corresponding to the signal strength. For example, the first audio output device may include a first external device (e.g., the first external device 521 of FIG. 5A) and a second external device (e.g., the second external device 523 of FIG. 5A). The signal strength 814 may include a signal strength determined by the first external device and a signal strength determined by the second external device.

The signal strength 814 may further include information on a device having determined the signal strength. For example, the signal strength 814 may further include an identifier or icon (e.g., a pair of earphones) representing the first audio output device.

When a second audio output device (e.g., headphones) paired with the electronic device receives a signal (e.g., a PA signal or a BIS) broadcast by a third audio source device, the electronic device may receive a signal strength of the signal from the third audio source device from the second audio output device. The electronic device may generate and output the list 810 displaying a signal strength 816 along with information on the third audio source device. The signal strength 816 may further include information on a device having determined the signal strength. For example, the signal strength 816 may further include an identifier or icon (e.g., headphones) representing the second audio output device.

When the electronic device receives a signal (e.g., an EA/PA signal or a BIS) broadcast by the second audio source device, the electronic device may generate and output the list 810 displaying a signal strength 812 along with information on the second audio source device. For example, the signal strength 812 may further include an identifier or icon representing the electronic device. For example, the signal strength 812 may not include an identifier or icon representing the electronic device.

Figure 9:
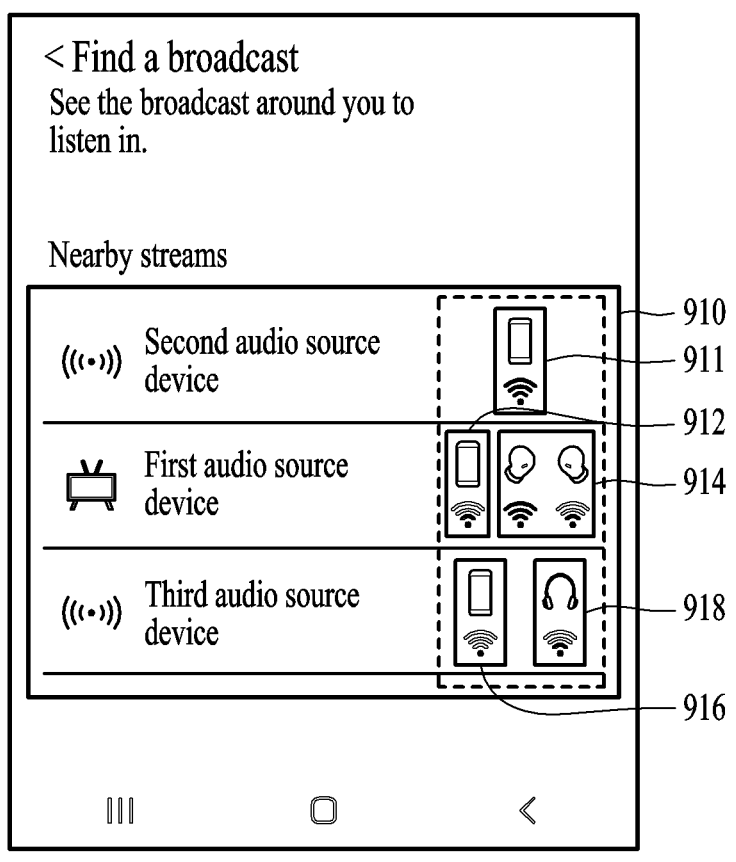
FIG. 9 illustrates a list that outputs a signal strength of a signal of an audio source device received by an electronic device and a signal strength of a signal of the audio source device received by an audio output device according to an embodiment of the disclosure.

FIG. 9 illustrates a list that outputs a signal strength of a signal of an audio source device received by an electronic device and a signal strength of a signal of the audio source device received by an audio output device according to an embodiment of the disclosure.

According to an embodiment, an electronic device (e.g., the electronic device 101 of FIG. 1, the electronic device 302 of FIG. 3, or the electronic device 510 of FIG. 5A) may generate a list 910 displaying both a signal strength 912 of a first signal of a first audio source device received by the electronic device and a signal strength 914 of a second signal of the first audio source device received by a first audio output device (e.g., the electronic device 102 or 104 of FIG. 1, the audio output device 304 of FIG. 3, or the audio output device 520 of FIG. 5A).

The signal strength 914 displayed in association with information on the first audio source device may be a numeric, image, or icon corresponding to the signal strength. For example, the first audio output device may include a first external device (e.g., the first external device 521 of FIG. 5A) and a second external device (e.g., the second external device 523 of FIG. 5A). The signal strength 914 may include a signal strength determined by the first external device and a signal strength determined by the second external device.

The signal strength 914 may further include information on a device having determined the signal strength. For example, the signal strength 914 may further include an identifier or icon representing the first audio output device.

When a second audio output device (e.g., headphones) paired with the electronic device receives a signal (e.g., a PA signal or a BIS) broadcast by a third audio source device, the electronic device may receive a signal strength of the signal from the third audio source device from the second audio output device. The electronic device may generate and output the list 910 displaying a signal strength 918 along with a signal strength 916 of a first signal of the third audio source device received by the electronic device and information on the third audio source device. The signal strength 918 may further include information on a device having determined the signal strength. For example, the signal strength 918 may further include an identifier or icon representing the second audio output device.

When the electronic device receives a signal (e.g., an EA/PA signal or a BIS) broadcast by the second audio source device, the electronic device may generate and output the list 910 displaying a signal strength 911 along with information on the second audio source device. For example, the signal strength 911 may further include an identifier or icon representing the electronic device.

Although not shown, when a cradle (or case) of the first audio output device receives a signal (e.g., an EA signal or a PA signal) broadcast by the first audio source device, the cradle of the first audio output device may determine a signal strength of the received signal and transmit the determined signal strength to the electronic device. The electronic device may further output the signal strength received from the cradle of the first audio output device along with the signal strength 912 and the signal strength 914 through the list 910. The electronic device may determine one signal strength based on the signal strength received from the cradle of the first audio output device and the signal strength received from the first audio output device, and output the determined signal strength as the signal strength 914.

Figure 10:
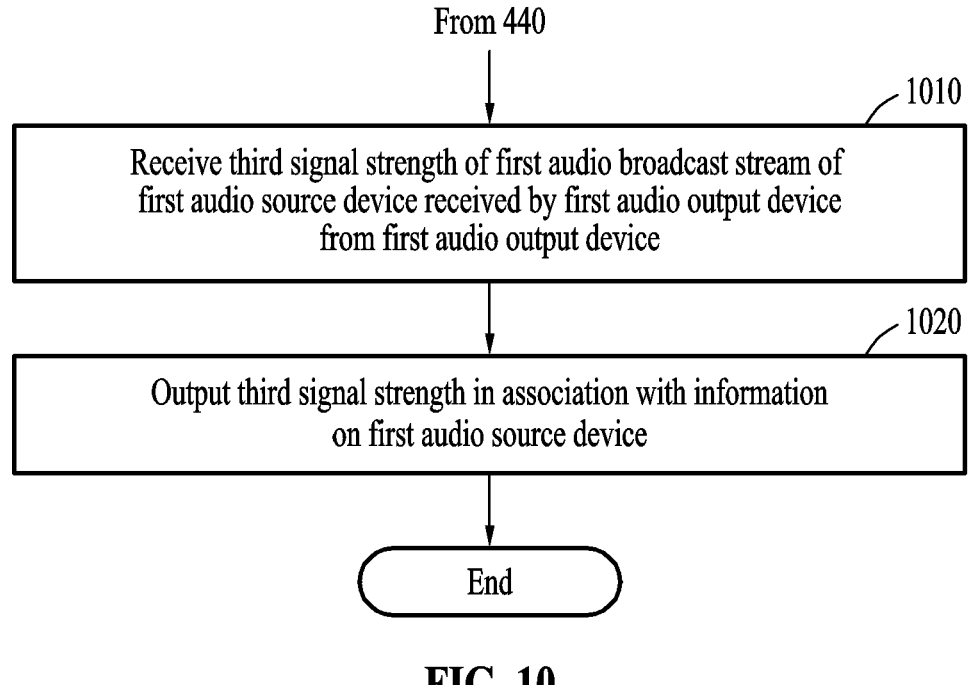
FIG. 10 is a flowchart of a method of outputting a third signal strength of a first audio broadcast stream received from an audio output device according to an embodiment of the disclosure.

FIG. 10 is a flowchart of a method of outputting a third signal strength of a first audio broadcast stream received from an audio output device according to an embodiment of the disclosure.

According to an embodiment, operations 1010 and 1020 described below may be further performed after operation 440 described above with reference to FIG. 4 is performed. Operations 1010 and 1020 may be performed by an electronic device (e.g., the electronic device 101 of FIG. 1, the electronic device 302 of FIG. 3, or the electronic device 510 of FIG. 5A).

In operation 1010, a processor (e.g., the processor 120 of FIG. 1) of the electronic device may receive a third signal strength of a first audio broadcast stream of a first audio source device (e.g., the first audio source device 310 or the second audio source device 320 of FIG. 3) received by a first audio output device (e.g., the electronic device 102 or 104 of FIG. 1, the audio output device 304 of FIG. 3, or the audio output device 520 of FIG. 5A) from the first audio output device through a wireless link. For example, the first audio broadcast stream may be a BIS.

According to an embodiment, the first audio output device may determine the signal strength of the received first audio broadcast stream to be the third signal strength. A method of determining the signal strength of the first audio broadcast stream is described in detail below with reference to FIGS. 14 to 17.

According to an embodiment, the first audio output device may include a first external device (e.g., the first external device 521 of FIG. 5A) and a second external device (e.g., the second external device 523 of FIG. 5A). A first wireless link may be established between the electronic device and the first external device, and a second wireless link may be established between the electronic device and the second external device. The processor of the electronic device may receive a third-first signal strength of a third-first signal that is the first audio broadcast stream of the first audio source device received by the first external device from the first external device through the first wireless link. The processor of the electronic device may receive a third-second signal strength of a third-second signal for the third-first signal that is the first audio broadcast stream of the first audio source device received by the second external device from the second external device through the second wireless link.

In operation 1020, the processor of the electronic device may output the third signal strength in association with the information on the first audio source device. The processor may output the received information on the first audio source device and the third signal strength through a display. A user may visually verify a reception state of the first audio broadcast stream for the first audio output device through the output third signal strength.

According to an embodiment, the processor of the electronic device may determine the third signal strength based on the third-first signal strength received from the first external device and the third-second signal strength received from the second external device, and output the third signal strength in association with the information on the first audio source device.

According to an embodiment, the processor of the electronic device may determine an integrated signal strength based on the first signal strength determined by the electronic device and the third signal strength received from the first audio output device, and output the integrated signal strength in association with the information on the first audio source device.

According to an embodiment, the processor of the electronic device may output the signal strengths that are based on the first signal strength determined by the electronic device, the third-first signal strength received from the first external device, and the third-second signal strength received from the second external device in association with the information on the first audio source device.

According to an embodiment, the processor of the electronic device may output the first signal strength determined by the electronic device and the third signal strength received from the first audio output device in association with the information on the first audio source device.

Figure 11:
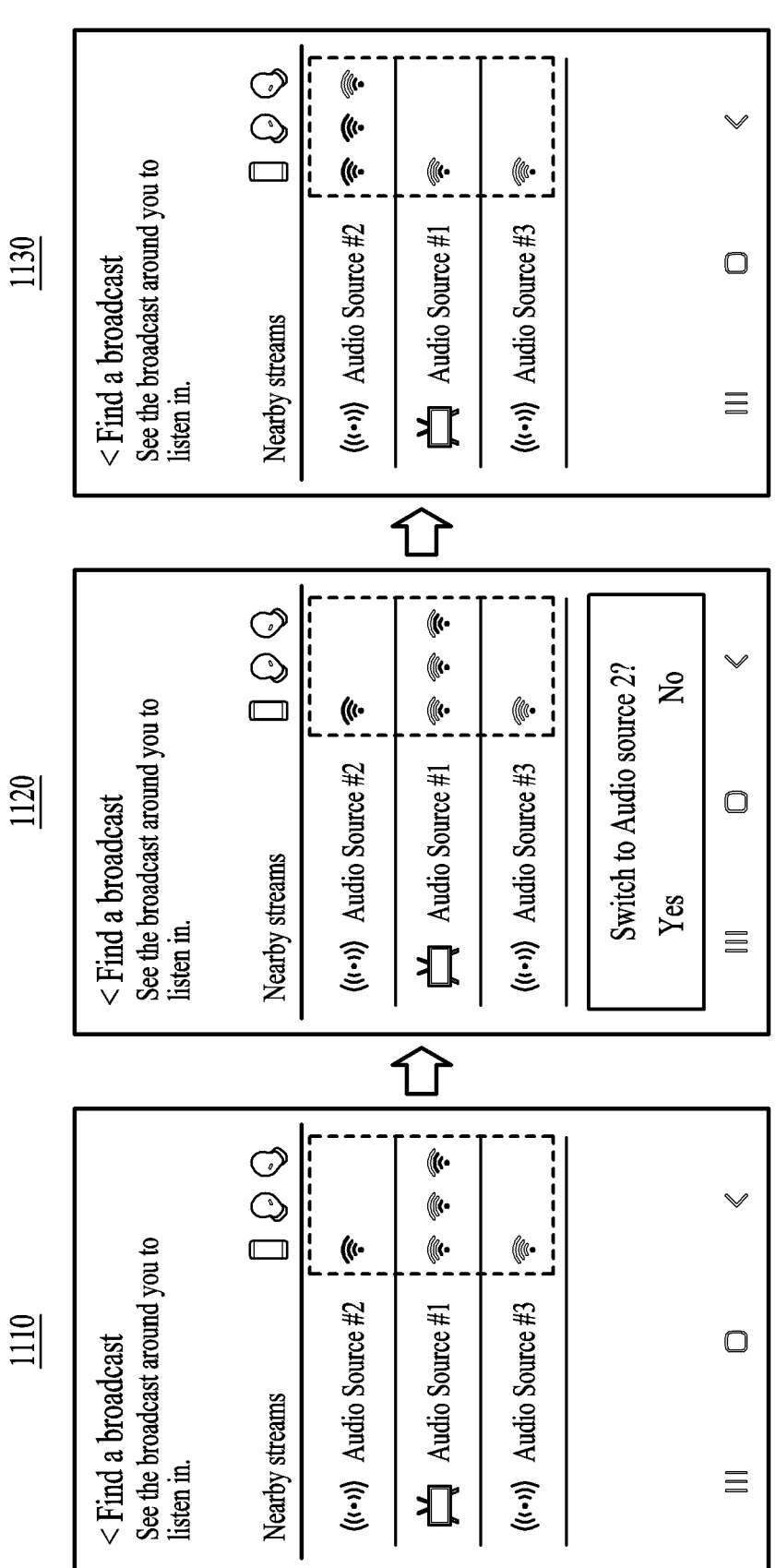
FIG. 11 illustrates a UX of an electronic device that changes with a change in an audio broadcast stream received by an audio output device according to an embodiment of the disclosure.

FIG. 11 illustrates a UX of an electronic device that changes with a change in an audio broadcast stream received by an audio output device according to an embodiment of the disclosure.

In operation 1110, an electronic device (e.g., the electronic device 101 of FIG. 1, the electronic device 302 of FIG. 3, or the electronic device 510 of FIG. 5A) may output signal strengths of signals of one or more audio source devices received by the electronic device and a signal strength of a first audio broadcast stream of a first audio source device received by a first audio output device (e.g., the electronic device 102 or 104 of FIG. 1, the audio output device 304 of FIG. 3, or the audio output device 520 of FIG. 5A).

In the illustrated embodiment, it is shown that signal strengths respectively for a first external device (e.g., the first external device 521 of FIG. 5A) and a second external device (e.g., the second external device 523 of FIG. 5A) of the first audio output device are output, but the electronic device may determine one signal strength for the first audio output device and output the one signal strength. For example, the electronic device may determine the higher signal strength of the two signal strengths to be the final signal strength. For example, the electronic device may determine the lower signal strength of the two signal strengths to be the final signal strength. For example, the electronic device may determine the average of the two signal strengths to be the final signal strength.

A user may verify the output signal strengths and select a second audio source device with a good signal reception state as an audio source device that is to provide an audio broadcast stream to the first audio output device.

In operation 1120, the electronic device may output a message enquiring whether to assign the second audio source device as an audio source device that is to provide an audio broadcast stream to the first audio output device.

For example, when the user selects "Yes", the electronic device may transmit address information of a second audio broadcast stream broadcast by the second audio source device to the first audio output device. The first audio output device may receive the second audio broadcast stream based on the address information of the second audio broadcast stream.

For example, when the user selects "Yes", the electronic device may transmit a command instructing to receive the second audio broadcast stream broadcast by the second audio source device to the first audio output device. The first audio output device may receive the second audio broadcast stream based on the address information included in the information on the second audio source device received by the first audio output device.

The first audio output device may determine a signal strength of the second audio broadcast stream and transmit the determined signal strength of the second audio broadcast stream to the electronic device.

According to an embodiment, the second audio source device may be an audio source device selected by the user.

According to an embodiment, the second audio source device may be an audio source device recommended by the electronic device based on signal strengths of a plurality of audio source devices.

In operation 1130, the electronic device may output the signal strengths of the signals of the one or more audio source devices received by the electronic device and a signal strength of the signal (e.g., a PA signal or an audio broadcast stream) received by the first audio output device.

Figure 12:
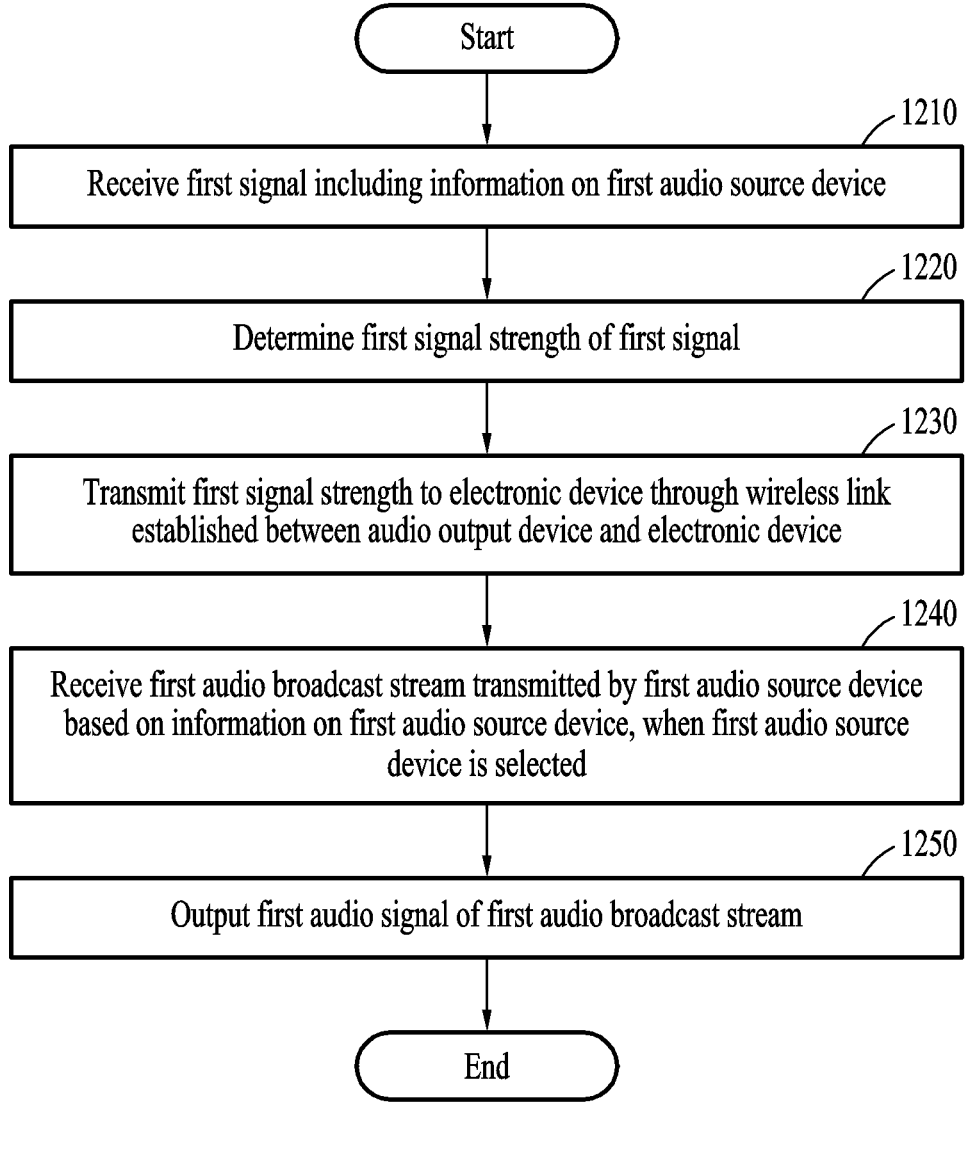
FIG. 12 is a flowchart of a method of outputting an audio signal performed by an audio output device according to an embodiment of the disclosure.

FIG. 12 is a flowchart of a method of outputting an audio signal performed by an audio output device according to an embodiment of the disclosure.

Operations 1210 to 1250 described below may be performed by an audio output device (e.g., the electronic device 102 or 104 of FIG. 1, the audio output device 304 of FIG. 3, or the audio output device 520 of FIG. 5A). For example, the audio output device may include a processor, a communication module, memory, a sensor unit, and a battery. The description of the processor, the communication module, the memory, a sound output module, the sensor unit, and the battery of the audio output device may be replaced with the description of the processor 120, the communication module 190, the memory 130, the sound output module 155, the sensor module 176, and the battery 189 described with reference to FIG. 1.

In operation 1210, the processor of the audio output device may receive a first signal including information on a first audio source device (e.g., the first audio source device 310 or the second audio source device 320 of FIG. 3) through the communication module. For example, the first audio source device may periodically broadcast the information on the first audio source device, and the audio output device may scan external data through the communication module to receive the first signal including the broadcast information on the first audio source device. For example, the first signal including the information on the audio source device may be an EA signal.

In operation 1220, the processor of the audio output device may determine a first signal strength of the first signal received through the communication module. According to an embodiment, the processor may determine the first signal strength of the first signal based on an RSSI of the first signal. For example, the first signal strength may be a target signal strength including the RSSI among a plurality of signal strengths having preset RSSI ranges. An example of the plurality of signal strengths having preset RSSI ranges is shown in Table 1 below.

In operation 1230, the processor of the audio output device may transmit the first signal strength through a wireless link established between the audio output device and an electronic device (e.g., the electronic device 101 of FIG. 1, the electronic device 302 of FIG. 3, or the electronic device 510 of FIG. 5A).

According to an embodiment, if the audio output device does not scan external data, operations 1210 to 1230 described above may not be performed.

In operation 1240, when a command (e.g., an add source command) instructing to receive the first audio broadcast stream broadcasted by the first audio source device is received from the electronic device, the processor of the audio output device may receive the first audio broadcast stream broadcast by the first audio source device based on information on the first audio source device through the communication module. The processor may receive selection of the first audio source device from the electronic device through the wireless link. For example, when the user selects the first audio source device, the electronic device may transmit the add source command to the first audio output device.

For example, the user may select the first audio source device through the electronic device, and the electronic device may transmit a command instructing to receive the first audio broadcast stream broadcast by the first audio source device to an audio output device. The audio output device may receive the first audio broadcast stream based on the information on the first audio source device received by the audio output device.

According to an embodiment, when operations 1210 to 1230 are not performed and the audio output device does not receive the information on the first audio source device, the electronic device may transmit an add source command to the audio output device. For example, the add source command may include at least one of address information, a broadcast identifier, PA synchronization information, or BIS information of the first audio source device. The processor of the audio output device may receive a second signal (e.g., a PA signal) broadcast by the first audio source device based on the add source command received from the electronic device through the communication module, and receive the first audio broadcast stream based on the second signal.

According to an embodiment, the processor of the audio output device may determine a signal strength of the second signal and transmit the signal strength of the second signal as a second signal strength to the electronic device.

In operation 1250, the processor of the audio output device may output a first audio signal of the first audio broadcast stream received through the communication module. The processor may provide an audio to the user by outputting the first audio signal.

Figure 13:
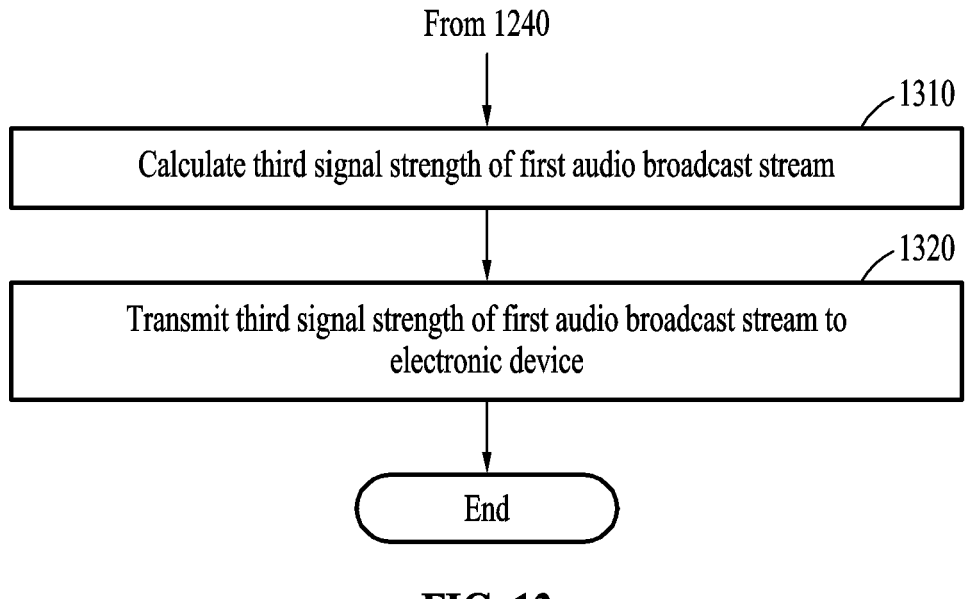
FIG. 13 is a flowchart of a method of transmitting a signal strength of an audio broadcast stream received by an audio output device to an electronic device according to an embodiment of the disclosure.

FIG. 13 is a flowchart of a method of transmitting a signal strength of an audio broadcast stream received by an audio output device to an electronic device according to an embodiment of the disclosure.

According to an embodiment, operations 1310 and 1320 described below may be further performed after operation 1240 described above with reference to FIG. 12 is performed. Operations 1310 and 1320 may be performed by an audio output device (e.g., the electronic device 102 or 104 of FIG. 1, the audio output device 304 of FIG. 3, or the audio output device 520 of FIG. 5A).

In operation 1310, a processor of the audio output device may determine a signal strength of a first audio broadcast stream received through a communication module to be a third signal strength. A method of determining the signal strength of the first audio broadcast stream is described in detail below with reference to FIGS. 14 to 17.

In operation 1320, the processor may transmit the signal strength of the first audio broadcast stream to an electronic device (e.g., the electronic device 101 of FIG. 1, the electronic device 302 of FIG. 3, or the electronic device 510 of FIG. 5A) through the communication module.

Figure 14:
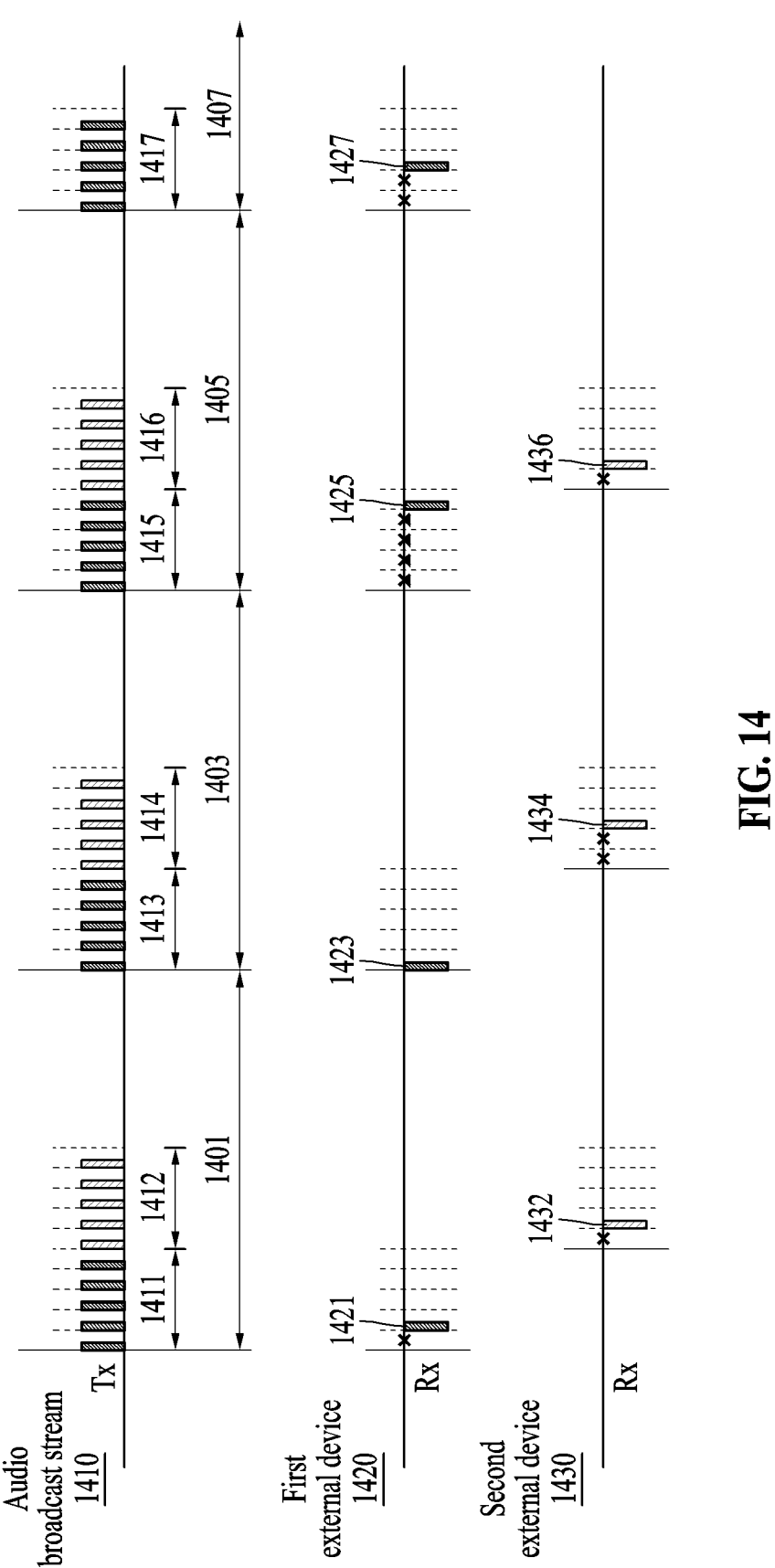
FIG. 14 illustrates a method of determining a signal strength of an audio broadcast stream received by an audio output device according to an embodiment of the disclosure.

FIG. 14 illustrates a method of determining a signal strength of an audio broadcast stream received by an audio output device according to an embodiment of the disclosure.

According to an embodiment, an audio broadcast stream 1410 may include a plurality of event sections 1411, 1412, 1413, 1414, 1415, 1416, and 1417. For example, the event sections 1411, 1413, 1415, and 1417 may be for a first external device 1420 (e.g., the first external device 521 of FIG. 5A), and the event sections 1412, 1414, and 1416 may be for a second external device 1430 (e.g., the second external device 523 of FIG. 5A). For example, each of the plurality of event sections 1411, 1412, 1413, 1414, 1415, 1416, and 1417 may include five subevents. The plurality of event sections 1411, 1412, 1413, 1414, 1415, 1416, and 1417 may be part of a broad isochronous group (BIG). Each of the event sections 1411, 1412, 1413, 1414, 1415, 1416, and 1417 may be a BIS event, and packets within an event section may be transmitted through subevents. The number of subevents (NSE) of the audio broadcast stream 1410 is "5", the number of BISs is "2", the burst number (BN) is "1", and the immediate repetition count (IRC) is "5".

The first external device 1420 may receive packets within the event sections 1411, 1413, 1415, and 1417 and output a first audio signal based on the received packets. The second external device 1430 may receive packets within the event sections 1412, 1414, and 1416 and output a second audio signal based on the received packets.

Depending on a wireless environment between an audio source device (e.g., the audio source device 310 or 320 of FIG. 3) broadcasting the audio broadcast stream 1410 and the first external device 1420, the initial packet received for each event section by the first external device 1420 and the number of packets received for each event section may vary.

According to an embodiment, the first external device 1420 or the second external device 1430 may determine a signal strength based on an RSSI of the initial packet received in each event section and transmit the determined signal strength to an electronic device (e.g., the electronic device 101 of FIG. 1, the electronic device 302 of FIG. 3, or the electronic device 510 of FIG. 5A). The signal strength may be the "third signal strength of the first audio broadcast stream" in operation 1310 described above with reference to FIG. 13. An example of the plurality of signal strengths having preset RSSI ranges is shown in Table 1 below.

When the first external device 1420 initially receives a second packet 1421 among the packets of the event section 1411, the first external device 1420 may determine a signal strength (e.g., "0") based on an RSSI of the second packet 1421 and transmit the determined signal strength to the electronic device. When the first external device 1420 initially receives a first packet 1423 among the packets of the event section 1413, the first external device 1420 may determine a signal strength (e.g., "0") based on an RSSI of the first packet 1423 and transmit the determined signal strength to the electronic device. When the first external device 1420 initially receives a fifth packet 1425 among the packets of the event section 1415, the first external device 1420 may determine a signal strength (e.g., "2") based on an RSSI of the fifth packet 1425 and transmit the determined signal strength to the electronic device. When the first external device 1420 initially receives a third packet 1427 among the packets of the event section 1417, the first external device 1420 may determine a signal strength (e.g., "1") based on an RSSI of the third packet 1427 and transmit the determined signal strength to the electronic device. In the above example, the electronic device may receive the signal strengths of "0", "0", "2", and "1" sequentially from the first external device 1420, and output the changing signal strengths in association with information on the corresponding audio source devices.

When the second external device 1430 initially receives a second packet 1432 among the packets of the event section 1412, the second external device 1430 may determine a signal strength (e.g., "0") based on an RSSI of the second packet 1432 and transmit the determined signal strength to the electronic device. When the second external device 1430 initially receives a third packet 1434 among the packets of the event section 1414, the second external device 1430 may determine a signal strength (e.g., "1") based on an RSSI of the third packet 1434 and transmit the determined signal strength to the electronic device. When the second external device 1430 initially receives a second packet 1436 among the packets of the event section 1416, the second external device 1430 may determine a signal strength (e.g., "0") based on an RSSI of the second packet 1436 and transmit the determined signal strength to the electronic device. In the above example, the electronic device may receive the signal strengths of "0", "1", and "0" sequentially from the second external device 1430, and output the changing signal strengths in association with information on the corresponding audio source devices.

For example, the first external device 1420 or the second external device 1430 may determine a signal strength based on an RSSI of the initial packet received in each event section and, only when the determined signal strength changes compared to the signal strength for the previous event section, transmit the determined signal strength to the electronic device (e.g., the electronic device 101 of FIG. 1, the electronic device 302 of FIG. 3, or the electronic device 510 of FIG. 5A).

For example, the first external device 1420 or the second external device 1430 may determine a signal strength based on an RSSI of the initial packet received in each event section, determine a value for time or preset event sections using a moving average (MA) or exponential moving average (EMA), and, only when the determined value changes compared to the previous value, transmit the determined value as the signal strength to the electronic device. For example, the first external device 1420 or the second external device 1430 may compare the current signal strength determined for a first section 1401 and a second section 1403 and the previous signal strength determined for a third section 1405 and a fourth section 1407 and, when the current signal strength is not the same as the previous signal strength, transmit the current signal strength to the electronic device.

According to an embodiment, the first external device 1420 or the second external device 1430 may determine a signal strength based on a reception failure count for the same packet received in each event section and transmit the determined signal strength to the electronic device. For example, the first external device 1420 or the second external device 1430 may determine a packet reception score based on the reception failure count for the same packet, and determine a signal strength corresponding to the packet reception score among the plurality of signal strengths. An example of packet reception scores is shown in Table 2.

TABLE 2

| Packet reception score (x) | Signal strength |
|---|---|
| 0.8 ≤ x | 0 |
| 0.5 ≤ x < 0.8 | 1 |
| 0.2 ≤ x < 0.5 | 2 |
| x < 0.2 | 3 |

For example, the packet reception score may be determined using Equation 1.

$$\text{Packet reception score} = \qquad\qquad\qquad \text{Equation 1}$$
$$1 - (\text{Reception failure count for the same packet}/NSE)$$

For the same packet, when the successfully received packet is the first packet, the reception failure count may be "0", when the successfully received packet is the second packet, the reception failure count may be "1", when the successfully received packet is the third packet, the reception failure count may be "2", when the successfully received packet is the fourth packet, the reception failure count may be "3", and when the successfully received packet is the fifth packet, the reception failure count may be "4".

For example, when the NSE of the event section 1411 of FIG. 14 is "5", the BN is "1", the IRC is "5", and the first external device 1420 initially receives the second packet 1421 among the packets of the event section 1411 (i.e., the value of reception failure count is "1"), the packet reception score for the event section 1411 may be determined to be "1−(1/5)=0.8". The packet reception score of 0.8 may correspond to a signal strength of "0". Similarly, the signal strength for the event section 1413 may be determined to be "0", the signal strength for the event section 1415 may be determined to be "2", and the signal strength for the event section 1417 may be determined to be "1".

Similar to the event sections 1411, 1413, 1415, and 1417 for the first external device 1420, signal strengths for the event sections 1412, 1414, and 1416 for the second external device 1430 may be determined. The signal strength for the event section 1412 may be determined to be "0", the signal strength for the event section 1414 may be determined to be "1", and the signal strength for the event section 1416 may be determined to be "0".

The example of Equation 1 may apply as is for the BN of "1" and the IRC of "5", and if the BN or IRC changes, an equation corresponding to the BN or IRC may apply. For example, when the BN is "2", a final packet reception score may be determined based on a first packet reception score for a first packet and a second packet reception score for a second packet. For example, the average value of the first packet reception score and the second packet reception score may be calculated as the final packet reception score. For example, the higher value of the first packet reception score and the second packet reception score may be calculated as the final packet reception score. For example, the lower value of the first packet reception score and the second packet reception score may be calculated as the final packet reception score.

According to an embodiment, the first external device 1420 or the second external device 1430 may determine a signal strength based on the order or position of the initial packet received in each event section and, only when the determined signal strength changes compared to the signal strength for the previous event section, transmit the determined signal strength to the electronic device (e.g., the electronic device 101 of FIG. 1, the electronic device 302 of FIG. 3, or the electronic device 510 of FIG. 5A).

According to an embodiment, the first external device 1420 or the second external device 1430 may determine a signal strength based on a reception failure count for the same packet in each event section, determine a value for time or preset event sections using an MA or EMA, and, only when the determined value changes compared to the previous value, transmit the determined value as the signal strength to the electronic device.

Figure 15:
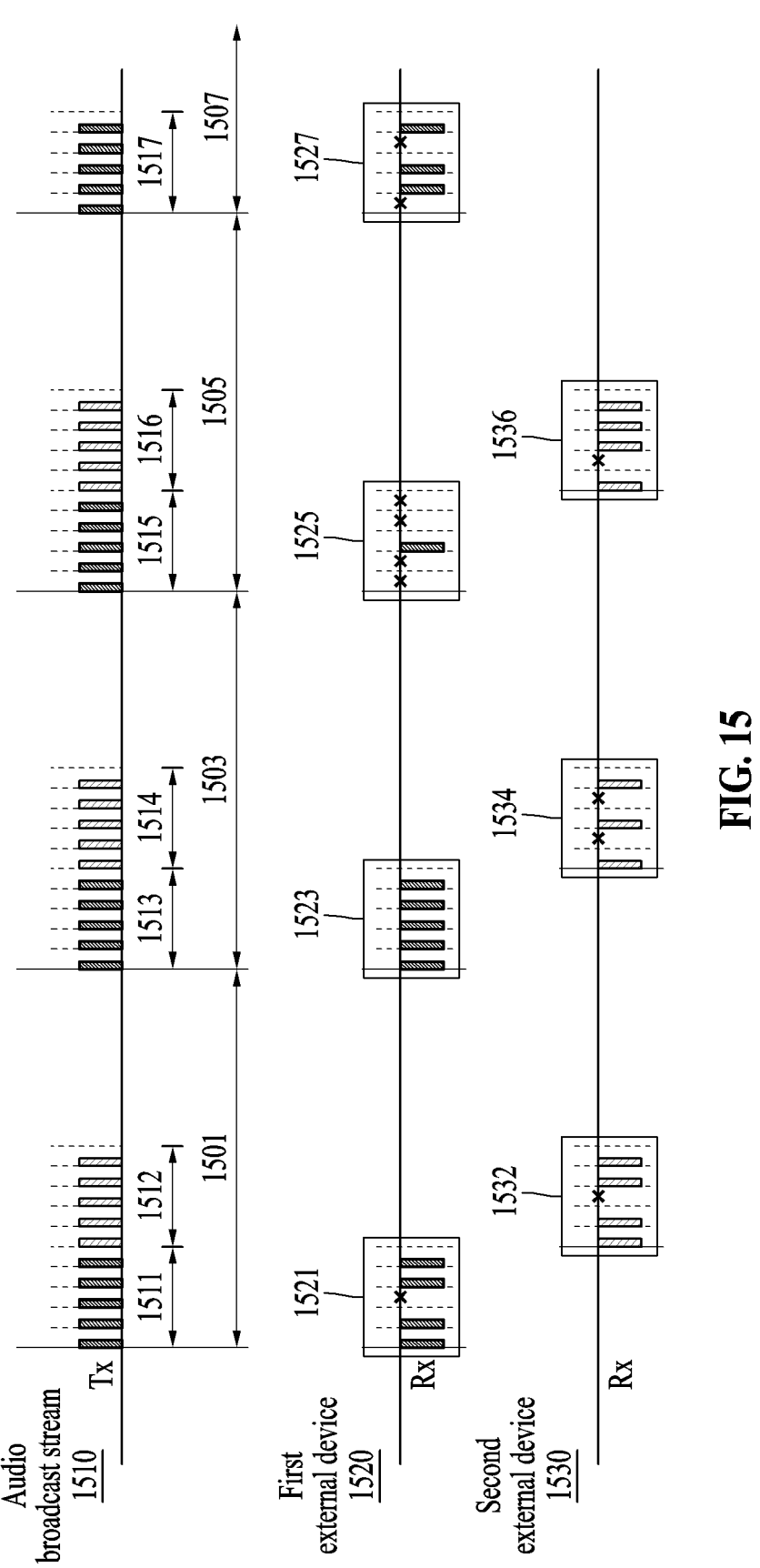
FIG. 15 illustrates a method of determining a signal strength based on the number of packets in an audio broadcast stream received by an audio output device according to an embodiment of the disclosure.

FIG. 15 illustrates a method of determining a signal strength based on the number of packets in an audio broadcast stream received by an audio output device according to an embodiment of the disclosure.

According to an embodiment, an audio broadcast stream 1510 may include a plurality of event sections 1511, 1512, 1513, 1514, 1515, 1516, and 1517. For example, the event sections 1511, 1513, 1515, and 1517 may be for a first external device 1520 (e.g., the first external device 521 of FIG. 5A or the first external device 1420 of FIG. 14), and the event sections 1512, 1514, and 1516 may be for a second external device 1530 (e.g., the second external device 523 of FIG. 5A or the second external device 1530 of FIG. 14). For example, each of the plurality of event sections 1511, 1512, 1513, 1514, 1515, 1516, and 1517 may include five subevents. The NSE of the audio broadcast stream 1510 is "5", the number of BISs is "2", the BN is "5", and the IRC is "1".

Depending on a wireless environment between an audio source device (e.g., the audio source device 310 or 320 of FIG. 3) broadcasting the audio broadcast stream 1510 and the first external device 1520, the number of packets received for each event section by the first external device 1520 may vary.

According to an embodiment, the first external device 1520 or the second external device 1530 may determine a signal strength based on the number of packets received in each event section and transmit the determined signal strength to an electronic device (e.g., the electronic device 101 of FIG. 1, the electronic device 302 of FIG. 3, or the electronic device 510 of FIG. 5A). For example, the first external device 1520 or the second external device 1530 may determine a packet reception score based on the number of packets received, and determine a signal strength corresponding to the packet reception score among the plurality of signal strengths. An example of packet reception scores is shown in Table 2 above. For example, the packet reception score may be determined using Equation 2.

$$\text{Packet reception score} = \left(\text{Number of packets received}/NSE\right) \quad \text{Equation 2}$$

For example, when the NSE of the event section 1511 of FIG. 15 is "5", and the first external device 1520 receives four packets 1521 among the packets of the event section 1511, the packet reception score for the event section 1511 may be determined to be "(4/5)=0.8". The packet reception score of 0.8 may correspond to a signal strength of "0". Similarly, the signal strength for the event section 1513 in which five packets 1523 are received may be determined to be "0", the signal strength for the event section 1515 in which one packet 1525 is received may be determined to be "2", and the signal strength for the event section 1517 in which three packets 1527 are received may be determined to be "1".

Similar to the event sections 1511, 1513, 1515, and 1517 for the first external device 1520, signal strengths for the event sections 1512, 1514, and 1516 for the second external device 1530 may be determined. The signal strength for the event section 1512 in which four packets 1532 are received may be determined to be "0", the signal strength for the event section 1514 in which three packets 1534 are received may be determined to be "1", and the signal strength for the event section 1516 in which four packets 1536 are received may be determined to be "0".

For example, the first external device 1520 or the second external device 1530 may determine a signal strength based on the number of packets received in each event section and, only when the determined signal strength changes compared to the signal strength for the previous event section, transmit the signal strength to the electronic device.

For example, the first external device 1520 or the second external device 1530 may determine a signal strength based on the number of packets received in each event section, determine a value for time or preset event sections using an MA or EMA, and, only when the determined value changes compared to the previous value, transmit the determined value as the signal strength to the electronic device. For example, the first external device 1520 or the second external device 1530 may compare the current signal strength determined for a first section 1501 and a second section 1503 and the previous signal strength determined for a third section 1505 and a fourth section 1507 and, when the current signal strength is not the same as the previous signal strength, transmit the current signal strength to the electronic device.

Figure 16:
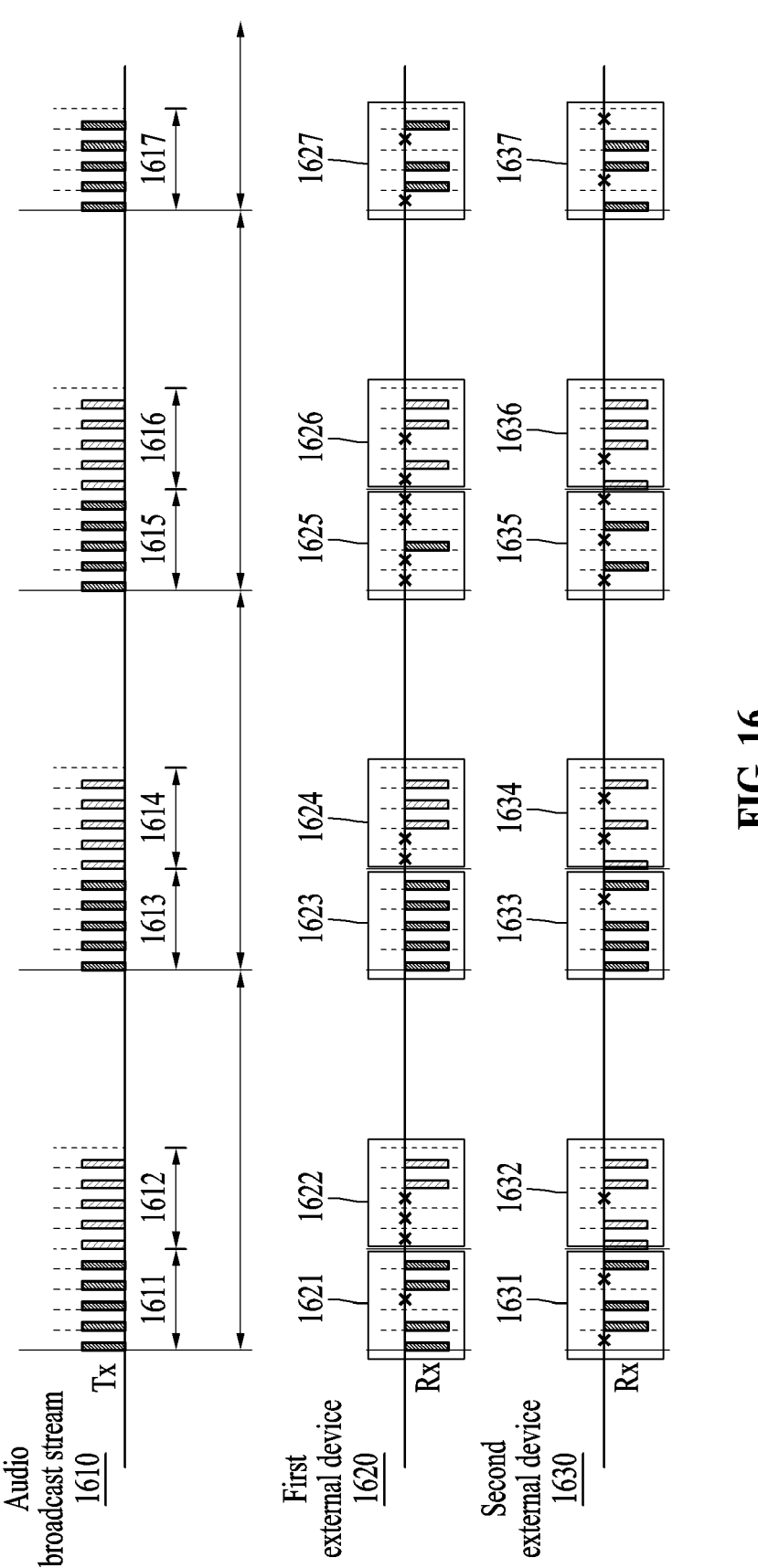
FIG. 16 illustrates a method of determining a signal strength based on the number of packets in an audio broadcast stream for a second external device received by a first external device of an audio output device according to an embodiment of the disclosure.

FIG. 16 illustrates a method of determining a signal strength based on the number of packets in an audio broadcast stream for a second external device received by a first external device of an audio output device according to an embodiment of the disclosure.

According to an embodiment, an audio broadcast stream 1610 may include a plurality of event sections 1611, 1612, 1613, 1614, 1615, 1616, and 1617. For example, the event sections 1611, 1613, 1615, and 1617 may be for a first external device 1620 (e.g., the first external device 521 of FIG. 5A, the first external device 1420 of FIG. 14, or the first external device 1520 of FIG. 15), and the event sections 1612, 1614, and 1616 may be for a second external device 1630 (e.g., the second external device 523 of FIG. 5A, the first external device 1430 of FIG. 14, or the second external device 1530 of FIG. 15). For example, each of the plurality of event sections 1611, 1612, 1613, 1614, 1615, 1616, and 1617 may include five subevents. The NSE of the audio broadcast stream 1610 is "5", the number of BISs is "2", the BN is "5", and the IRC is "1".

According to an embodiment, the first external device 1620 may receive packets of the event sections 1612, 1614, and 1616 corresponding to the second external device 1630, rather than the packets of the event sections 1611, 1613, 1615, and 1617 corresponding to the first external device 1620. The first external device 1620 may further determine a packet reception score for each of the event sections 1611, 1613, 1615, and 1617, as well as a packet reception score for each of the event sections 1612, 1614, and 1616. The first external device 1620 may determine the signal strength of the corresponding event section based on the packet reception score. The signal strength for the event section 1611 in which four packets 1621 are received may be determined to be "0", the signal strength for the event section 1612 in which two packets 1622 are received may be determined to be "2", the signal strength for the event section 1613 in which five packets 1623 are received may be determined to be "0", the signal strength for the event section 1614 in which three packets 1624 are received may be determined to be "1", the signal strength for the event section 1615 in which one packet 1625 is received may be determined to be "2", the signal strength for the event section 1616 in which three packets 1626 are received may be determined to be "1", and the signal strength for the event section 1617 in which three packets 1627 are received may be determined to be "1".

The first external device 1620 may transmit the packet reception score or signal strength for each of the event sections 1612, 1614, and 1616 to an electronic device (e.g., the electronic device 101 of FIG. 1, the electronic device 302 of FIG. 3, or the electronic device 510 of FIG. 5A). The electronic device may determine the signal strength of the audio broadcast stream 1610 based on the packet reception score or signal strength received from the first external device 1620.

According to an embodiment, the second external device 1630 may receive the packets of the event sections 1611, 1613, 1615, and 1617 corresponding to the first external device 1620, rather than the packets of the event sections 1612, 1614, and 1616 corresponding to the second external device 1630. The second external device 1630 may further determine a packet reception score for each of the event sections 1612, 1614, and 1616, as well as a packet reception score for each of the event sections 1611, 1613, 1615, and 1617. The second external device 1630 may determine the signal strength of the corresponding event section based on the packet reception score. The signal strength for the event section 1611 in which three packets 1631 are received may be determined to be "1", the signal strength for the event section 1612 in which four packets 1632 are received may be determined to be "0", the signal strength for the event section 1613 in which four packets 1633 are received may be determined to be "0", the signal strength for the event section 1614 in which three packets 1634 are received may be determined to be "1", the signal strength for the event section 1615 in which two packets 1635 are received may be determined to be "2", the signal strength for the event section 1616 in which four packets 1636 are received may be determined to be "0", and the signal strength for the event section 1617 in which three packets 1637 are received may be determined to be "1".

The second external device 1630 may transmit the packet reception score or signal strength for each of the event sections 1611, 1613, 1615, and 1617 to the electronic device. The electronic device may determine the signal strength of the audio broadcast stream 1610 based on the packet reception score or signal strength received from the second external device 1630.

Figure 17:
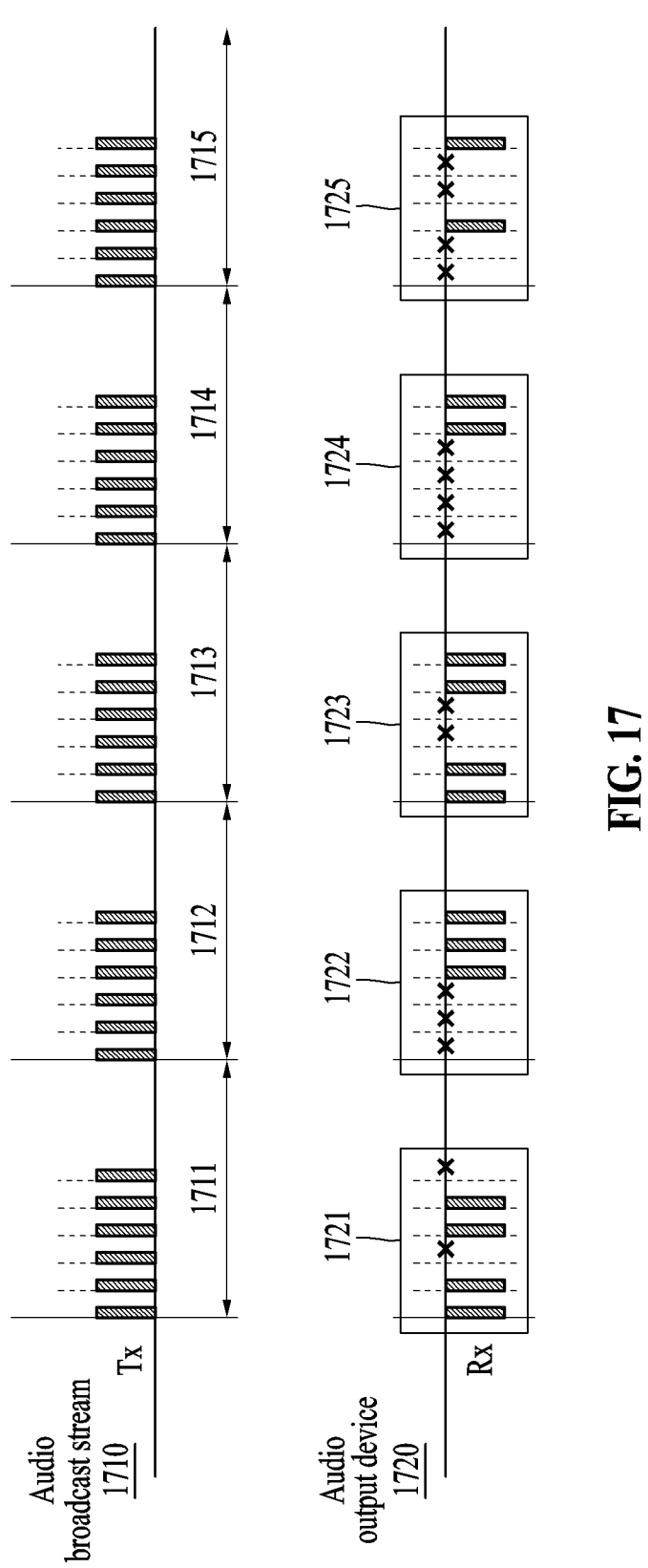
FIG. 17 illustrates a method of determining a signal strength using a weight determined based on the number of packets that an audio output device fails to receive for an audio broadcast stream with a burst number (BN) of "6" and an immediate repetition count (IRC) of "1" according to an embodiment of the disclosure.

FIG. 17 illustrates a method of determining a signal strength using a weight determined based on the number of packets that an audio output device fails to receive for an audio broadcast stream with a burst number (BN) of "6" and an immediate repetition count (IRC) of "1" according to an embodiment of the disclosure.

A first external device (e.g., the first external device 521 of FIG. 5A, the first external device 1420 of FIG. 14, the first external device 1520 of FIG. 15, or the first external device 1620 of FIG. 16) or a second external device (e.g., the second external device 523 of FIG. 5A, the second external device 1430 of FIG. 14, the second external device 1530 of FIG. 15, or the second external device 1630 of FIG. 16) of an audio output device 1720 (e.g., the electronic device 102 or 104 of FIG. 1, the audio output device 304 of FIG. 3, or the audio output device 520 of FIG. 5A) may determine a signal strength based on the reception continuity of received packets of an audio broadcast stream 1710.

According to an embodiment, the audio broadcast stream 1710 may include a plurality of event sections 1711, 1712, 1713, 1714, and 1715. For example, each of the plurality of event sections 1711, 1712, 1713, 1714, and 1715 may include six subevents. The NSE of the audio broadcast stream 1710 is "6", the number of BISs is "1", the BN is "6", and the IRC is "1".

According to an embodiment, the audio output device 1720 may determine a weight based on the continuity of packets that failed to be received for an event section and determine a signal strength for the event section based on the determined weight. The audio output device 1720 may determine a partial score based on the number of packets received in the event section, determine a packet reception score for the event section based on the partial score and the weight, and determine the signal strength corresponding to the determined packet reception score. For example, the partial score may be determined using Equation 2 described above. An example of weights for the continuity of packets that failed to be received is shown in Table 3.

TABLE 3

| Number of packets that failed to be received consecutively | Weight |
|---|---|
| 1 | 1 |
| 2 | 0.9 |
| 3 | 0.7 |
| 4 | 0.5 |
| 5 | 0.3 |

An example of signal strengths for packet reception scores is shown in Table 4.

TABLE 4

| Packet reception score (x) | Signal strength |
|---|---|
| $0.7 \leq x$ | 0 |
| $0.4 \leq x < 0.7$ | 1 |
| $0.2 \leq x < 0.4$ | 2 |
| $x < 0.2$ | 3 |

For example, the audio output device 1720 may receive four packets 1721 among the packets of the event section 1711. The partial score for the event section 1711 may be determined to be "4/6". Since the third and sixth packets among the packets of the event section 1711 failed to be received, the weight for the event section 1711 may be determined to be "(1)×(1)=1". The packet reception score for the event section 1711 may be (4/6)×(1)=4/6. The signal strength for the event section 1711 may be determined to be "1".

For example, the audio output device 1720 may receive three packets 1722 among the packets of the event section 1712. The partial score for the event section 1712 may be determined to be "3/6". Since the first to third packets among the packets of the event section 1712 failed to be received consecutively, the weight for the event section 1712 may be determined to be "0.7". The packet reception score for the event section 1712 may be "(3/6)×(0.7)=0.35". The signal strength for the event section 1712 may be determined to be "2".

For example, the audio output device 1720 may receive four packets 1723 among the packets of the event section 1713. The partial score for the event section 1713 may be determined to be "4/6". Since the third and fourth packets among the packets of the event section 1713 failed to be received consecutively, the weight for the event section 1713 may be determined to be "0.9". The packet reception score for the event section 1713 may be "(4/6)×(0.9)=0.6". The signal strength for the event section 1713 may be determined to be "1".

For example, the audio output device 1720 may receive two packets 1724 among the packets of the event section 1714. The partial score for the event section 1714 may be determined to be "2/6". Since the first to fourth packets among the packets of the event section 1714 failed to be received consecutively, the weight for the event section 1714 may be determined to be "0.5". The packet reception score for the event section 1714 may be "(2/6)×(0.5)=0.17". The signal strength for the event section 1714 may be determined to be "3".

For example, the audio output device 1720 may receive two packets 1725 among the packets of the event section 1715. The partial score for the event section 1715 may be determined to be "2/6". Since among the packets of the event section 1715, the first and second packets failed to be received continuously, and the fourth and fifth packets failed to be received continuously, the weight for the event section 1715 may be determined to be "(0.9)×(0.9)=0.81". The packet reception score for the event section 1715 may be "(2/6)×(0.81)=0.27". The signal strength for the event section 1715 may be determined to be "2".

According to an embodiment, the audio output device 1720 may determine a weight based on the continuity of packets that failed to be received for an event section and determine a signal strength for the event section based on the determined weight. The audio output device 1720 may determine the packet reception score for the event section using only the weight and determine the signal strength corresponding to the determined packet reception score. An example of weights for the continuity of packets that failed to be received is shown in Table 5. An example of signal strengths for packet reception scores is shown in Table 4 described above.

TABLE 5

| Number of packets that failed to be received consecutively | Weight |
|---|---|
| 1 | 1 |
| 2 | 0.7 |
| 3 | 0.5 |
| 4 | 0.3 |
| 5 | 0.3 |

For example, the audio output device 1720 may receive four packets 1721 among the packets of the event section 1711. Since the third and sixth packets among the packets of the event section 1711 failed to be received, the weight for the event section 1711 may be determined to be "(1)×(1)=1". The packet reception score for the event section 1711 may be "(1)×(1)=1". The signal strength for the event section 1711 may be determined to be "0".

For example, the audio output device 1720 may receive three packets 1722 among the packets of the event section 1712. Since the first to third packets among the packets of the event section 1712 failed to be received consecutively, the weight for the event section 1712 may be determined to be "0.5". The packet reception score for the event section 1712 may be "(1)×(0.5)=0.5". The signal strength for the event section 1712 may be determined to be "1".

For example, the audio output device 1720 may receive four packets 1723 among the packets of the event section 1713. Since the third and fourth packets among the packets of the event section 1713 failed to be received consecutively, the weight for the event section 1713 may be determined to be "0.7". The packet reception score for the event section 1713 may be "(1)×(0.7)=0.7". The signal strength for the event section 1713 may be determined to be "0".

For example, the audio output device 1720 may receive two packets 1724 among the packets of the event section 1714. Since the first to fourth packets among the packets of the event section 1714 failed to be received consecutively, the weight for the event section 1714 may be determined to be "0.3". The packet reception score for the event section 1714 may be "(1)×(0.3)=0.3". The signal strength for the event section 1714 may be determined to be "2".

For example, the audio output device 1720 may receive two packets 1725 among the packets of the event section 1715. Since among the packets of the event section 1715, the first and second packets failed to be received continuously, and the fourth and fifth packets failed to be received continuously, the weight for the event section 1715 may be determined to be "(0.7)×(0.7)=0.49". The packet reception score for the event section 1715 may be "(1)×(0.49)=0.49". The signal strength for the event section 1715 may be determined to be "1".

Figure 18:
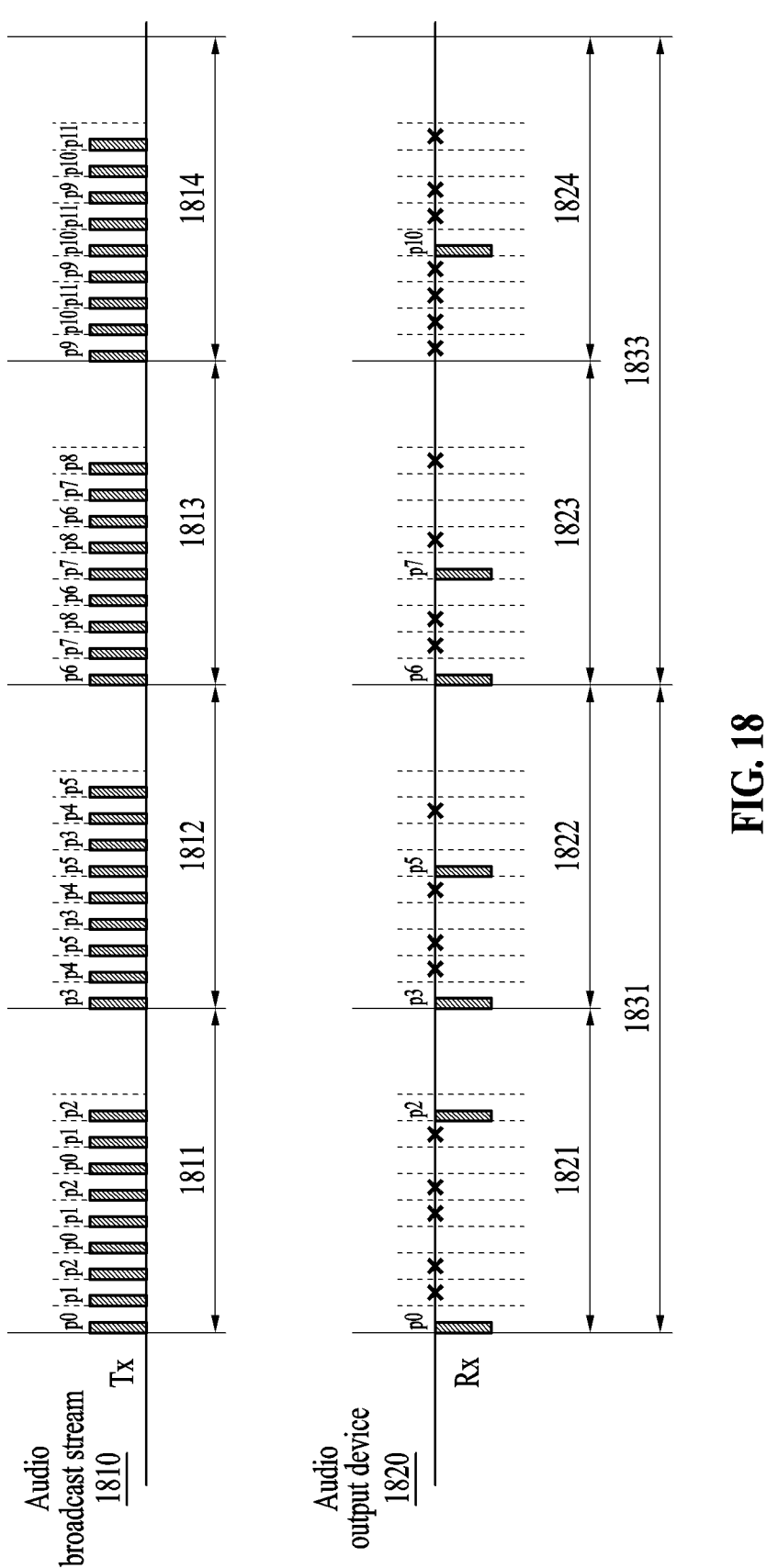
FIG. 18 illustrates a method of determining a signal strength using a weight determined based on the number of packets that an audio output device fails to receive for an audio broadcast stream with a BN of "3" and an IRC of "3" according to an embodiment of the disclosure.

FIG. 18 illustrates a method of determining a signal strength using a weight determined based on the number of packets that an audio output device fails to receive for an audio broadcast stream with a BN of "3" and an IRC of "3" according to an embodiment of the disclosure.

A first external device (e.g., the first external device 521 of FIG. 5A, the first external device 1420 of FIG. 14, the first external device 1520 of FIG. 15, or the first external device 1620 of FIG. 16) or a second external device (e.g., the second external device 523 of FIG. 5A, the second external device 1430 of FIG. 14, the second external device 1530 of FIG. 15, or the second external device 1630 of FIG. 16) of an audio output device 1820 (e.g., the electronic device 102 or 104 of FIG. 1, the audio output device 304 of FIG. 3, the audio output device 520 of FIG. 5A, or the audio output device 1720 of FIG. 17) may determine a signal strength based on a reception failure rate of received packets of an audio broadcast stream 1810.

According to an embodiment, the audio broadcast stream 1810 may include a plurality of event sections 1811, 1812, 1813, and 1814. For example, each of the plurality of event sections 1811, 1812, 1813, and 1814 may include nine subevents. The NSE of the audio broadcast stream 1810 is "9", the number of BISs is "1", the BN is "3", and the IRC is "3".

According to an embodiment, the audio output device 1820 may determine a weight based on the number of packets that failed to be received for an evaluation section and determine a signal strength for the evaluation section based on the determined weight. The evaluation section may include one or more event sections. For example, a first evaluation section 1831 may include reception sections 1821 and 1822 corresponding to the event sections 1811 and 1812, and a second evaluation section 1833 may include reception sections 1823 and 1824 corresponding to the event sections 1813 and 1814. The audio output device 1820 may determine a partial score based on a reception failure rate of packets for the evaluation section, determine a packet reception score for the evaluation section based on the partial score and the weight, and determine the signal strength corresponding to the determined packet reception score. For example, the partial score may be determined using Equation 3 below. An example of weights for the continuity of packets that failed to be received is shown in Table 6. An example of signal strengths for packet reception scores is shown in Table 4 described above.

$$\text{Partial score} = 1 - \quad\quad\quad\quad\quad\quad \text{Equation 3}$$

(Number of packets that failed to be received in evaluation section/Total number of packets of evaluation section)

TABLE 6

| Number of packets that failed to be received in evaluation section | Weight |
|---|---|
| 1 | 1 |
| 2 | 0.9 |
| 3 | 0.6 |
| 4 | 0.4 |

TABLE 6-continued

| Number of packets that failed to be received in evaluation section | Weight |
|---|---|
| 5 | 0.2 |
| 6 | 0 |

For example, in the first evaluation section 1831, the audio output device 1820 received four packets p0, p2, p3, and p5 among a total of six packets p0, p1, p2, p3, p4, and p5 and failed to receive the other two packets p1 and p4. For the first evaluation section 1831, the partial score may be determined to be "1−(2/6)=0.667", the weight may be determined to be "0.9", and the packet reception score may be determined to be "0.667×0.9=0.6003". The signal strength corresponding to the packet reception score of "0.6003" may be determined.

For example, in the second evaluation section 1833, the audio output device 1820 received three packets p6, p7, and p10 among a total of six packets p6, p7, p8, p9, p10, and p11 and failed to receive the other three packets p8, p9, and P11. For the second evaluation section 1833, the partial score may be determined to be "1−(3/6)=0.5", the weight may be determined to be "0.6", and the packet reception score may be determined to be "0.5×0.6=0.3". The signal strength corresponding to the packet reception score of "0.3" may be determined.

For example, the audio output device 1820 may determine a signal strength for the event section, determine a value for time, evaluation sections, or preset event sections using an MA or EMA, and, only when the determined value changes compared to the previous value, transmit the determined value as the signal strength to the electronic device. For example, the audio output device 1820 may compare the current signal strength determined for the first evaluation section 1831 and the previous signal strength determined for the second evaluation section 1833 and, when the current signal strength is not the same as the previous signal strength, transmit the current signal strength to the electronic device.

Figure 19:
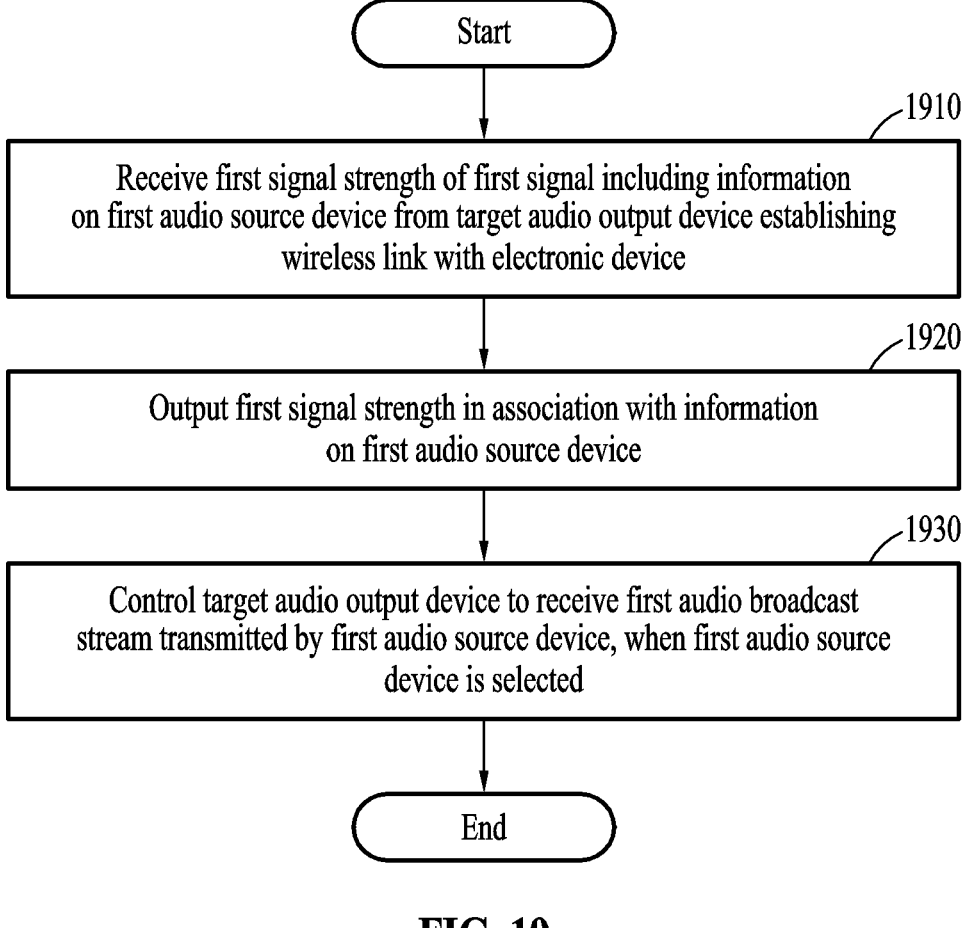
FIG. 19 is a flowchart of a method of outputting a signal strength of a signal of an audio source device received from an audio output device, performed by an electronic device, according to an embodiment of the disclosure.

FIG. 19 is a flowchart of a method of outputting a signal strength of a signal of an audio source device received from an audio output device, performed by an electronic device, according to an embodiment of the disclosure.

Operations 1910 to 1930 described below may be performed by an electronic device (e.g., the electronic device 101 of FIG. 1 or the electronic device 302 of FIG. 3). For example, the electronic device may include a processor (e.g., the processor 120 of FIG. 1), a communication module (e.g., the communication module 190 of FIG. 1), memory (e.g., the memory 130 of FIG. 1), and a display (e.g., the display module 160 of FIG. 1).

In operation 1910, the processor of the electronic device may receive a first signal strength of a first signal including information on a first audio source device (e.g., the audio source device 310 or 320 of FIG. 3) received by a first audio output device (e.g., the electronic device 102 or 104 of FIG. 1, the audio output device 304 of FIG. 3, the audio output device 520 of FIG. 5A, the audio output device 1720 of FIG. 17, or the audio output device 1820 of FIG. 18) through a wireless link. For example, the first signal may be an EA signal or a PA signal. A further detailed description of operation 1910 may be replaced with the description of operation 710 described above with reference to FIG. 7.

In operation 1920, the electronic device may output the first signal strength in association with the information on the first audio source device. A further detailed description of operation 1920 may be replaced with the description of operation 720 described above with reference to FIG. 7.

In operation 1930, when the first audio source device is selected, the electronic device may control the first audio output device to receive a first audio broadcast stream transmitted by the first audio source device. A further detailed description of operation 1930 may be replaced with the description of operation 440 described above with reference to FIG. 4.

According to an embodiment, after operation 1930 is performed, operations 1010 and 1020 described above with reference to FIG. 10 may be further performed.

Figure 20:
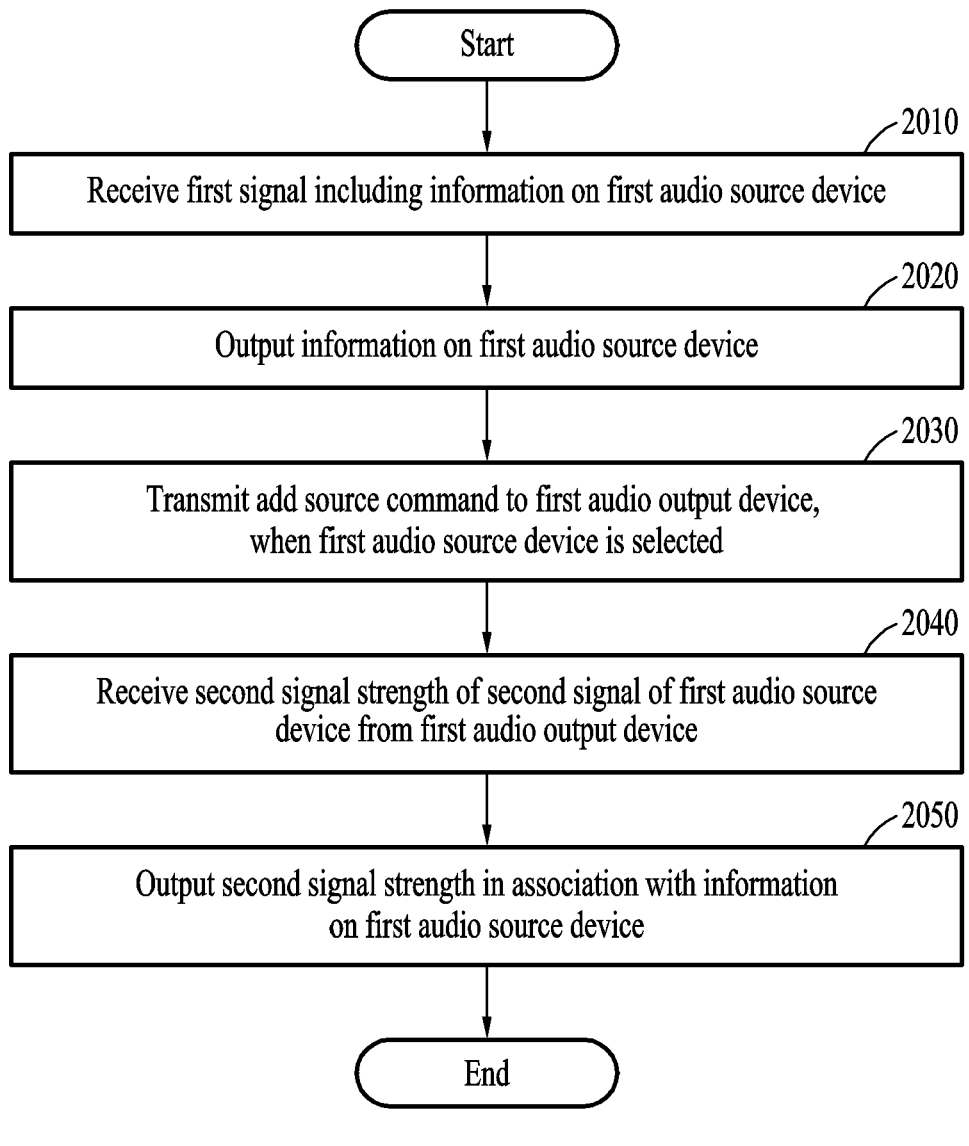
FIG. 20 is a flowchart of a method of outputting a signal strength of a signal of an audio source device received from an audio output device, performed by an electronic device, according to an embodiment of the disclosure.

FIG. 20 is a flowchart of a method of outputting a signal strength of a signal of an audio source device received from an audio output device, performed by an electronic device, according to an embodiment of the disclosure.

Operations 2010 to 2050 described below may be performed by an electronic device (e.g., the electronic device 101 of FIG. 1 or the electronic device 302 of FIG. 3). For example, the electronic device may include a processor (e.g., the processor 120 of FIG. 1), a communication module (e.g., the communication module 190 of FIG. 1), memory (e.g., the memory 130 of FIG. 1), and a display (e.g., the display module 160 of FIG. 1).

In operation 2010, the processor of the electronic device may receive a first signal including information on a first audio source device (e.g., the first audio source device 310 or the second audio source device 320 of FIG. 3) through the communication module. A further detailed description of operation 2010 may be replaced with the description of operation 410 described above with reference to FIG. 4.

In operation 2020, the processor may output the information on the first audio source device. The processor may output the received information on the first audio source device through the display. For example, the processor may generate a list including at least a portion of the information on the first audio source device and output the generated list through the display. For example, identification information (e.g., a device name) indicating the first audio source device may be output.

A user may check the information on the first audio source device using the electronic device, and determine whether to receive the first audio broadcast stream broadcast by the first audio source device using an audio output device (e.g., the electronic device 102 or 104 of FIG. 1, the audio output device 304 of FIG. 3, the audio output device 520 of FIG. 5A, the audio output device 1720 of FIG. 17, or the audio output device 1820 of FIG. 18) based on the output information.

According to an embodiment, when outputting the quality of connection to the first audio source device is requested by the user, the processor of the electronic device may determine a first signal strength of a first signal and output the first signal strength in a list or as separate information. For example, the user may touch the information on the first audio source device in the list to request to output the quality of connection to the first audio source device.

In operation 2030, the processor may transmit, when the first audio source device is selected by the user, an add source command to the first audio output device establishing a wireless link with the electronic device based on the information on the first audio source device. A further detailed description of operation 2030 may be replaced with the description of operation 440 described above with reference to FIG. 4.

In operation 2040, the processor may receive a second signal strength of a second signal of the first audio source device from the first audio output device. For example, the second signal may be a PA signal or a BIS. A further detailed description of operation 2040 may be replaced with the description of operation 710 described above with reference to FIG. 7 or operation 1010 described above with reference to FIG. 10.

In operation 2050, the processor may output the second signal strength in association with the information on the first audio source device. A further detailed description of operation 2050 may be replaced with the description of operation 720 described above with reference to FIG. 7 or operation 1020 described above with reference to FIG. 10.

According to an embodiment, an electronic device 101, or an electronic device 302 may include a display module 160, a communication module 190, a display module, one or more processors 120, and memory 130, wherein the memory may store instructions that, when executed by the one or more processors, cause the electronic device to receive a first signal including information on a first audio source device through the communication module (in operation 410), determine a first signal strength of the first signal (in operation 420), output the first signal strength in association with the information on the first audio source device 310, or the second audio source device 320 (in operation 430), and transmit, when the first audio source device 310 is selected, an add source command to a first audio output device 102, 104, 304, 520, 1720, 1820 establishing a wireless link with the electronic device based on the information on the first audio source device (in operation 440).

According to an embodiment, the add source command may be transmitted to the first audio output device so that a first audio signal of a first audio broadcast stream may be output through the first audio output device.

According to an embodiment, the information on the first audio source device may include at least one of identification information of the first audio source device, account information, address information, clock information, information on the first audio broadcast stream, timing information, transmission power information, or audio channel map information.

According to an embodiment, the first audio output device may include a first external device 521, 1420, 1520, 1620 and a second external device 523, 1430, 1530, 1630, a first wireless link may be established between the electronic device and the first external device, and a second wireless link may be established between the electronic device and the second external device.

According to an embodiment, the wireless link may be Bluetooth or Bluetooth low energy (BLE).

According to an embodiment, when executed by the one or more processors, the instructions may cause the electronic device to further receive a second signal strength of a second signal including the information on the first audio source device received by the first audio output device from the first audio output device through the wireless link (in operations 710 and 1910), and output the second signal strength in association with the information on the first audio source device (in operations 720 and 1920).

According to an embodiment, the first audio output device may include a first external device 521, 1420, 1520, 1620 and a second external device 523, 1430, 1530, 1630, a first wireless link may be established between the electronic device and the first external device, and a second wireless link may be established between the electronic device and the second external device, wherein when executed by the one or more processors, the instructions may cause the electronic device to further receive a second-first signal strength of a second-first signal including the information on the first audio source device received by the first external device from the first external device through the first wireless link, receive a second-second signal strength of a second-second signal including the information on the first audio source device received by the second external device from the second external device through the second wireless link, determine the second signal strength based on at least one of the second-first signal strength and the second-second signal strength, and output the second signal strength in association with the information on the first audio source device.

According to an embodiment, when executed by the one or more processors, the instructions may cause the electronic device to further receive a second signal strength of a second signal including the information on the first audio source device received by the first audio output device from the first audio output device through the wireless link, determine an integrated signal strength based on the first signal strength and the second signal strength, and output the integrated signal strength in association with the information on the first audio source device.

According to an embodiment, when executed by the one or more processors, the instructions may cause the electronic device to further receive a second signal strength of a second signal including the information on the first audio source device received by the first audio output device from the first audio output device through the wireless link, and output the first signal strength and the second signal strength in association with the information on the first audio source device.

According to an embodiment, when executed by the one or more processors, the instructions may cause the electronic device to further receive a third signal strength of the first audio broadcast stream of the first audio source device received by the first audio output device from the first audio output device through the wireless link (in operation 1010), and output the third signal strength in association with the information on the first audio source device (in operation 1020).

According to an embodiment, the third signal strength may be determined by the first audio output device based on a receiver signal strength indicator (RSSI) of the first audio broadcast stream.

According to an embodiment, the third signal strength may be determined by the first audio output device based on a packet reception rate for a plurality of packets of the first audio broadcast stream.

According to an embodiment, the third signal strength may be determined by the first audio output device further based on reception continuity of the plurality of packets of the first audio broadcast stream.

According to an embodiment, when executed by the one or more processors, the instructions may cause the electronic device to further generate, when receiving pieces of information on a plurality of audio source devices, a list in which the pieces of information on the plurality of audio source devices are arranged in order of a preset priority, and output the generated list through the display module.

According to an embodiment, an electronic device 101, or an electronic device 302 may include a display module 160, a communication module 190, one or more processors 120, and memory 130, wherein the memory may store instructions that, when executed by the one or more processors, cause the electronic device to receive a first signal strength of a first signal including information on a first audio source device from a first audio output device 102, 104, 304, 520, 1720, 1820 establishing a wireless link with the electronic device through the communication module (in operation 1910), output the first signal strength in association with the information on the first audio source device (in operation 1920), and control, when the first audio source device is selected, the first audio output device to receive a first audio broadcast stream transmitted by the first audio source device (in operation 1930).

According to an embodiment, when executed by the one or more processors, the instructions may cause the electronic device to further receive a second signal including the information on the first audio source device through the communication module (in operation 410), determine a second signal strength of the second signal (in operation 420), and output the second signal strength in association with the information on the first audio source device (in operation 430).

According to an embodiment, a first audio signal of the first audio broadcast stream may be output through the first audio output device based on address information of the first audio broadcast stream included in the first signal.

According to an embodiment, an audio providing method, performed by an electronic device 101, or an electronic device 302, may include receiving a first signal strength of a first signal including information on a first audio source device from a first audio output device 102, 104, 304, 520, 1720, 1820 establishing a wireless link with the electronic device (in operation 1910), outputting the first signal strength in association with the information on the first audio source device (in operation 1920), and controlling, when the first audio source device is selected, the first audio output device to receive a first audio broadcast stream transmitted by the first audio source device (in operation 1930).

According to an embodiment, an audio output device 102, 104, 304, 520, 1720, 1820 may include a communication module, one or more processors, and memory, wherein the memory may store instructions that, when executed by the one or more processors, cause the audio output device to receive a first signal including information on a first audio source device (in operation 1210), determine a first signal strength of the first signal (in operation 1220), transmit the first signal strength to an electronic device through a wireless link established between the audio output device and the electronic device (in operation 1230), receive a first audio broadcast stream broadcast by the first audio source device based on the information on the first source device, in response to a command instructing to receive the first audio broadcast stream broadcast by the first audio source device (in operation 1240), and output a first audio signal of the first audio broadcast stream (in operation 1250).

According to an embodiment, the command may be an add source command.

The embodiments described herein may be implemented using a hardware component, a software component and/or a combination thereof. A processing device may be implemented using one or more general-purpose or special-purpose computers, such as, for example, one or more processors, a controller and an arithmetic logic unit (ALU), a DSP, a microcomputer, a field-programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, digital versatile discs (DVDs), and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the embodiments have been described with reference to the limited drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Accordingly, other implementations are within the scope of the following claims.

What is claimed is:

1. An electronic device comprising:
   a display;
   a communication circuit;
   one or more processors; and
   memory,
   wherein the memory stores instructions that, when executed by the one or more processors, cause the electronic device to:

receive a first signal comprising information on a first audio source device through the communication circuit, determine a first signal strength of the first signal, output, through the display, the first signal strength in association with the information on the first audio source device, transmit, when the first audio source device is selected, an add source command to a first audio output device establishing a wireless link with the electronic device based on the information on the first audio source device, receive, from the first audio output device, a second signal strength of a second signal comprising the information on the first audio source device received by the first audio output device, output, through the display, the first signal strength and the second signal strength in association with the information on the first audio source device and the first signal strength.

2. The electronic device of claim 1, wherein the add source command is transmitted to the first audio output device to control the first audio output device to output a first audio signal of a first audio broadcast stream from the first audio source device.

3. The electronic device of claim 1, wherein the information on the first audio source device comprises at least one of identification information of the first audio source device, account information, address information, clock information, information on a first audio broadcast stream, timing information, transmission power information, or audio channel map information.

4. The electronic device of claim 1,
   wherein the first audio output device comprises a first external device and a second external device,
   wherein a first wireless link is established between the electronic device and the first external device, and
   wherein a second wireless link is established between the electronic device and the second external device.

5. The electronic device of claim 1, wherein the electronic device transmits the add source command to the first audio output device through a Bluetooth or Bluetooth low energy (BLE) wireless link.

6. The electronic device of claim 1,
   wherein the first audio output device comprises a first external device and a second external device,
   wherein a first wireless link is established between the electronic device and the first external device,
   wherein a second wireless link is established between the electronic device and the second external device, and
   wherein when executed by the one or more processors, the instructions cause the electronic device to further:
   receive a second-first signal strength of a second-first signal comprising the information on the first audio source device received by the first external device from the first external device through the first wireless link,
   receive a second-second signal strength of a second-second signal comprising the information on the first audio source device received by the second external device from the second external device through the second wireless link, and
   determine the second signal strength based on at least one of the second-first signal strength and the second-second signal strength.

7. The electronic device of claim 1, wherein when executed by the one or more processors, the instructions cause the electronic device to further:
determine an integrated signal strength based on the first signal strength and the second signal strength, and
output, through the display, the integrated signal strength as the second signal strength in association with the information on the first audio source device.

8. The electronic device of claim 1, wherein when executed by the one or more processors, the instructions cause the electronic device to further:
receive, from the first audio output device, a third signal strength of a first audio broadcast stream of the first audio source device received by the first audio output device, and
output, through the display, the third signal strength in association with the information on the first audio source device.

9. The electronic device of claim 8, wherein the third signal strength is determined by the first audio output device based on a receiver signal strength indicator (RSSI) of the first audio broadcast stream.

10. The electronic device of claim 8, wherein the third signal strength is determined by the first audio output device based on a packet reception rate for a plurality of packets of the first audio broadcast stream.

11. The electronic device of claim 10, wherein the third signal strength is determined by the first audio output device further based on reception continuity of the plurality of packets of the first audio broadcast stream.

12. The electronic device of claim 1, wherein when executed by the one or more processors, the instructions cause the electronic device to further:
generate, when receiving pieces of information on a plurality of audio source devices, a list in which the pieces of information on the plurality of audio source devices are arranged in order of a preset priority, and
output, through the display, the generated list through the display.

13. An electronic device comprising:
a display;
a communication circuit;
one or more processors; and
memory,
wherein the memory stores instructions that, when executed by the one or more processors, cause the electronic device to:

44 receive a first signal strength of a first signal comprising information on a first audio source device from a first audio output device establishing a wireless link with the electronic device through the communication circuit,
output, through the display, the first signal strength in association with the information on the first audio source device,
control, when the first audio source device is selected, the first audio output device to receive a first audio broadcast stream transmitted by the first audio source device,
receive, from the first audio output device, a second signal strength of a second signal comprising the information on the first audio source device received by the first audio output device, and
output, through the display, the first signal strength and the second signal strength in association with the information on the first audio source device.

14. The electronic device of claim 13, wherein a first audio signal of the first audio broadcast stream is output through the first audio output device based on address information of the first audio broadcast stream included in the first signal.

15. An audio providing method, performed by an electronic device, the audio providing method comprising:
receiving a first signal strength of a first signal comprising information on a first audio source device from a first audio output device establishing a wireless link with the electronic device;
outputting, through a display of the electronic device, the first signal strength in association with the information on the first audio source device;
controlling, when the first audio source device is selected, the first audio output device to receive a first audio broadcast stream transmitted by the first audio source device;
receiving, from the first audio output device, a second signal strength of a second signal comprising the information on the first audio source device received by the first audio output device; and
outputting, through the display, the first signal strength and the second signal strength in association with the information on the first audio source device.

* * * * *